United States Patent
Tsuruyama et al.

(10) Patent No.: US 11,868,430 B2
(45) Date of Patent: Jan. 9, 2024

(54) IMAGE PROCESSING DEVICE, METHOD, AND STORAGE MEDIUM

(71) Applicant: KABUSHIKI KAISHA TOSHIBA, Tokyo (JP)

(72) Inventors: Tomoya Tsuruyama, Kawasaki Kanagawa (JP); Akihito Seki, Yokohama Kanagawa (JP); Nao Mishima, Inagi Tokyo (JP); Masako Kashiwagi, Ageo Saitama (JP); Norihiko Nakamura, Kawasaki Kanagawa (JP); Aira Hotta, Kawasaki Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 209 days.

(21) Appl. No.: 17/447,273

(22) Filed: Sep. 9, 2021

(65) Prior Publication Data
US 2022/0300757 A1 Sep. 22, 2022

(30) Foreign Application Priority Data

Mar. 17, 2021 (JP) ................................ 2021-043145

(51) Int. Cl.
*G06F 18/213* (2023.01)
*G06V 10/22* (2022.01)
*G06F 18/214* (2023.01)

(52) U.S. Cl.
CPC .......... *G06F 18/213* (2023.01); *G06F 18/214* (2023.01); *G06V 10/22* (2022.01)

(58) Field of Classification Search
CPC ............................ G06F 18/213; G06F 18/214
See application file for complete search history.

(56) References Cited

U.S. PATENT DOCUMENTS

| | | | | |
|---|---|---|---|---|
| 2015/0234865 A1* | 8/2015 | Lida | ...................... | G06V 40/166 348/349 |
| 2016/0155235 A1* | 6/2016 | Miyatani | ................. | G06T 7/521 382/103 |

(Continued)

FOREIGN PATENT DOCUMENTS

| | | |
|---|---|---|
| JP | 2019-35902 A | 3/2019 |
| JP | 2019-526878 A | 9/2019 |

(Continued)

OTHER PUBLICATIONS

M. Kashiwagi et al., "Deep Depth From Aberration Map," 2019 IEEE/CVF International Conference on Computer Vision (ICCV), IEEE/CVF Int'l Conf. on Computer Vision (ICCV), Doi: 10.1109/ICCV.2019.00417, pp. 4070-4079 (2019).

(Continued)

*Primary Examiner* — Casey L Kretzer
(74) *Attorney, Agent, or Firm* — Finnegan, Henderson, Farabow, Garrett & Dunner, LLP

(57) ABSTRACT

According to one embodiment, an image processing device includes first storage and a processor. The first storage is configured to store a first statistical model generated by learning bokeh which occurs in a first image. The processor is configured to acquire a second image, acquire a bokeh value which indicates bokeh occurring in the second image and an uncertainty level which indicates a level of uncertainty for the bokeh value, generate a first bokeh map based on the bokeh value and uncertainty level, and acquire a second bokeh map obtained by interpolating a bokeh value with respect to the first bokeh map. The bokeh value and the uncertainty level are output from the first statistical model by inputting the second image into the first statistical model.

12 Claims, 27 Drawing Sheets

(56) References Cited

U.S. PATENT DOCUMENTS

| | | | |
|---|---|---|---|
| 2019/0213481 A1 | 7/2019 | Godard et al. | |
| 2019/0387175 A1* | 12/2019 | Kikuchi | H04N 23/80 |
| 2020/0051264 A1 | 2/2020 | Mishima et al. | |
| 2020/0250468 A1 | 8/2020 | Kim et al. | |
| 2020/0294260 A1 | 9/2020 | Kashiwagi et al. | |
| 2020/0311468 A1 | 10/2020 | Kim et al. | |

FOREIGN PATENT DOCUMENTS

| | | |
|---|---|---|
| JP | 2020-26990 A | 2/2020 |
| JP | 2020-123114 A | 8/2020 |
| JP | 2020-126630 A | 8/2020 |
| JP | 2020-148483 A | 9/2020 |
| JP | 2020-166856 A | 10/2020 |

OTHER PUBLICATIONS

Yasuhiro Yao et al., "Discontinuous and Smooth Depth Completion with Binary Anisotropic Diffusion Tensor," IEEE Robotics and Automation Letters, arXiv:2006.14374v1 [cs.CV], 8 pages (Jun. 25, 2020).

Yasuhiro Yao et al., "Spatial Information Processing Technology for the Realization of 4D Digital Infrastructure," NTT Technical Journal, vol. 32, No. 10, pp. 74-79 https://journal.ntt.co.jp/wp-content/uploads/2020/10/JN202010074.pdf (Oct. 2020).

* cited by examiner

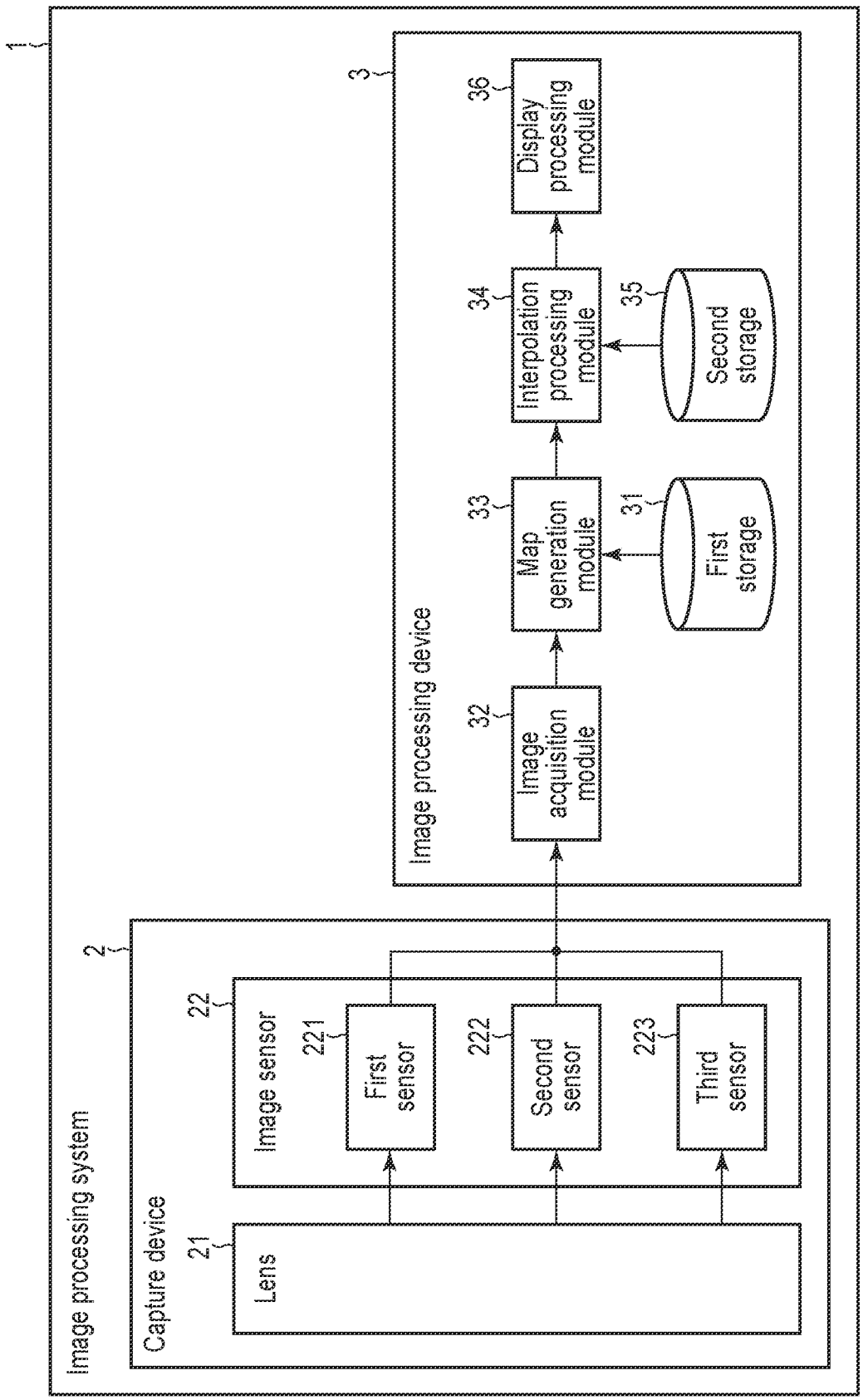
F I G. 1

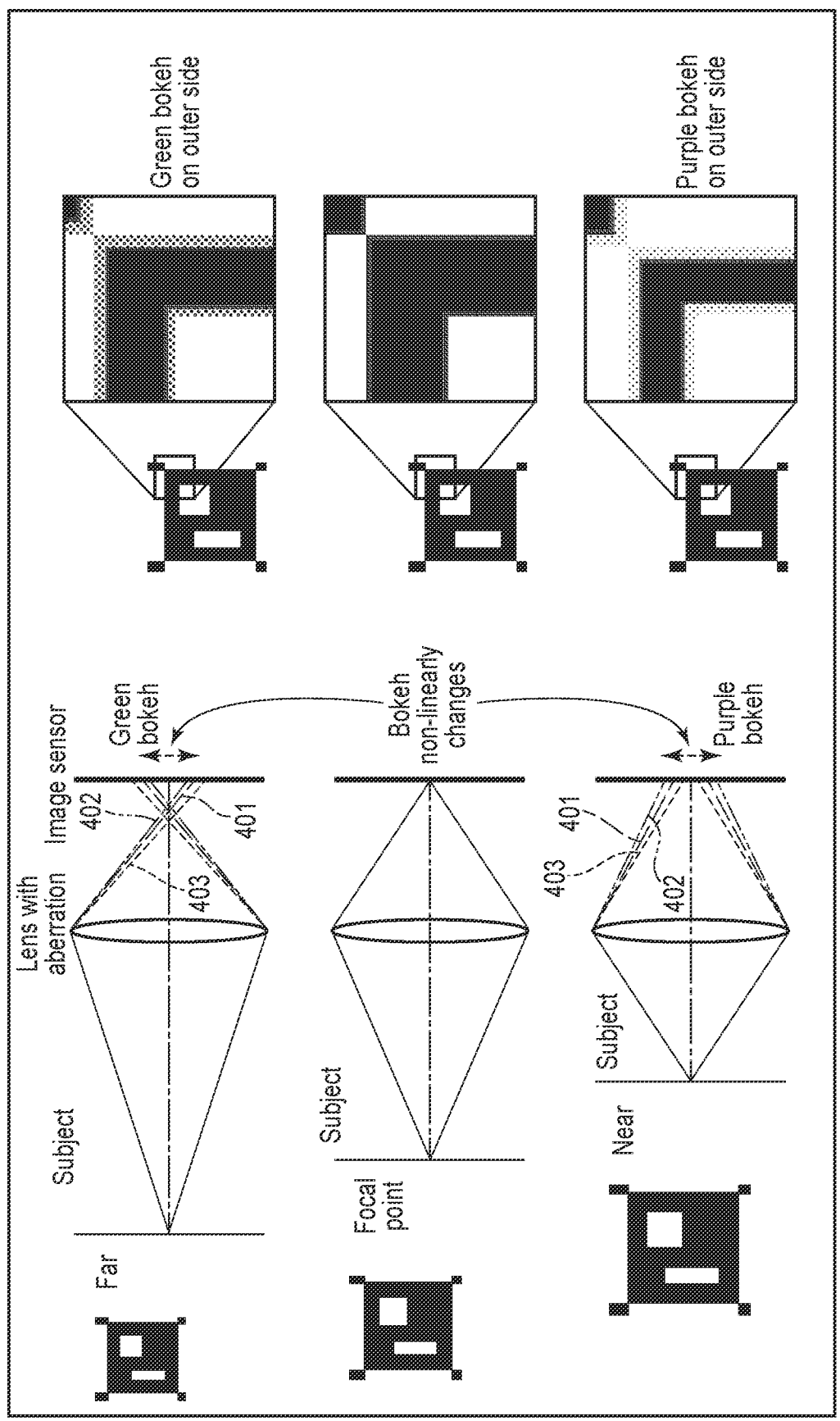
F I G. 5

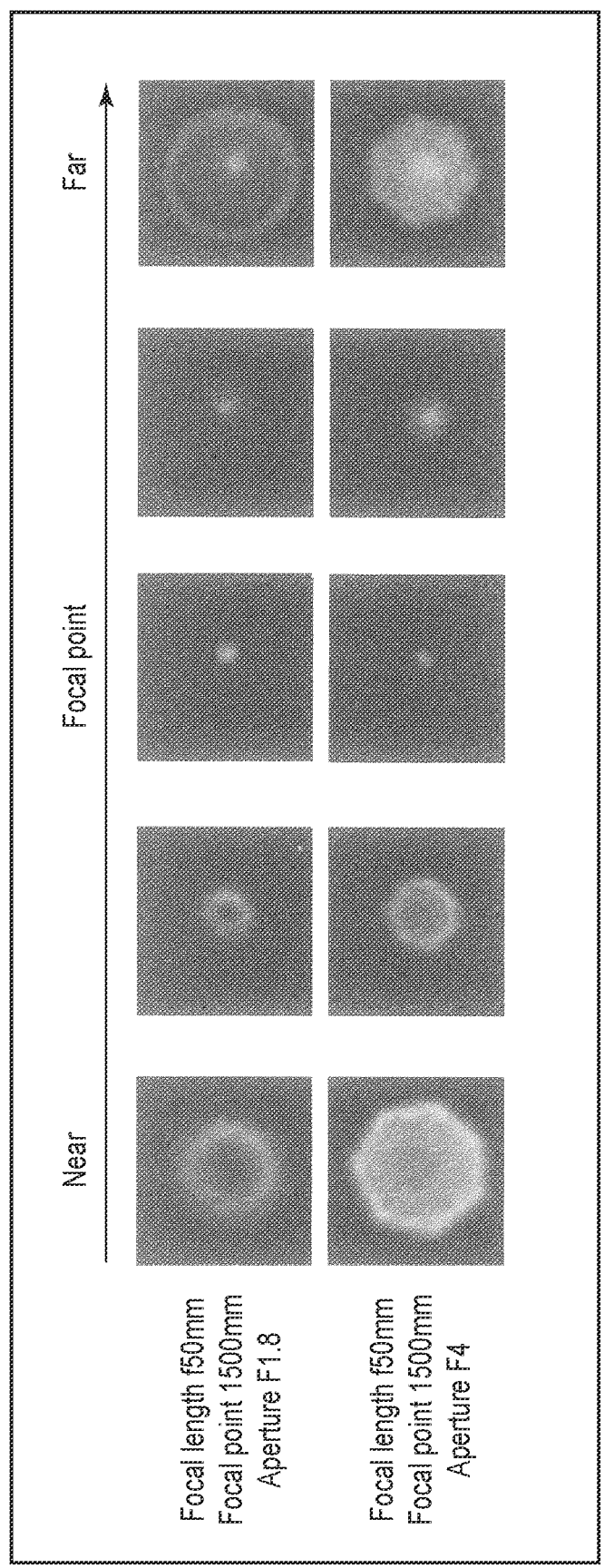
F I G. 6

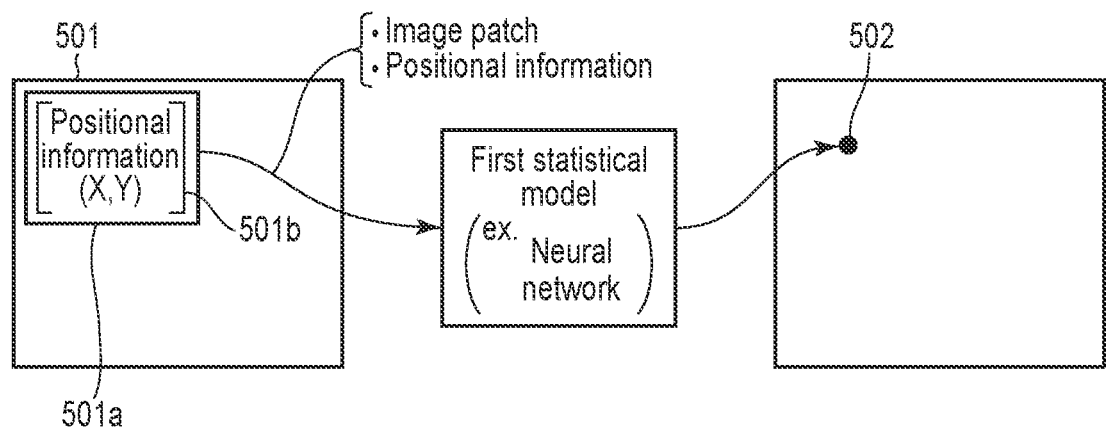
F I G. 14
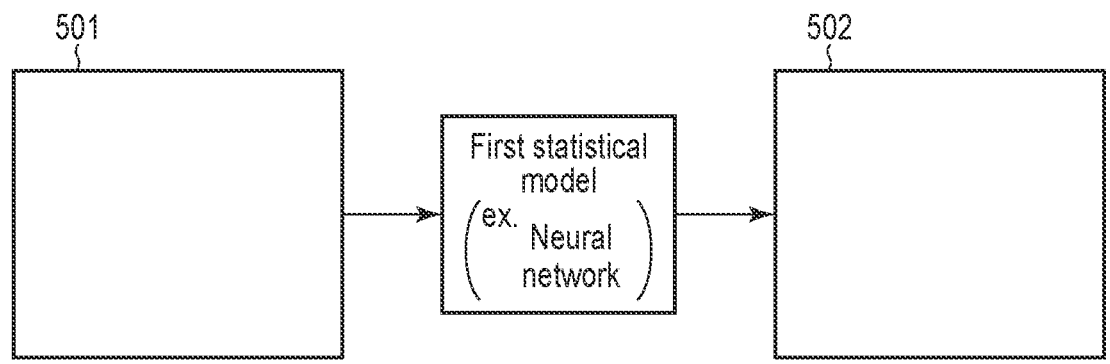
F I G. 16

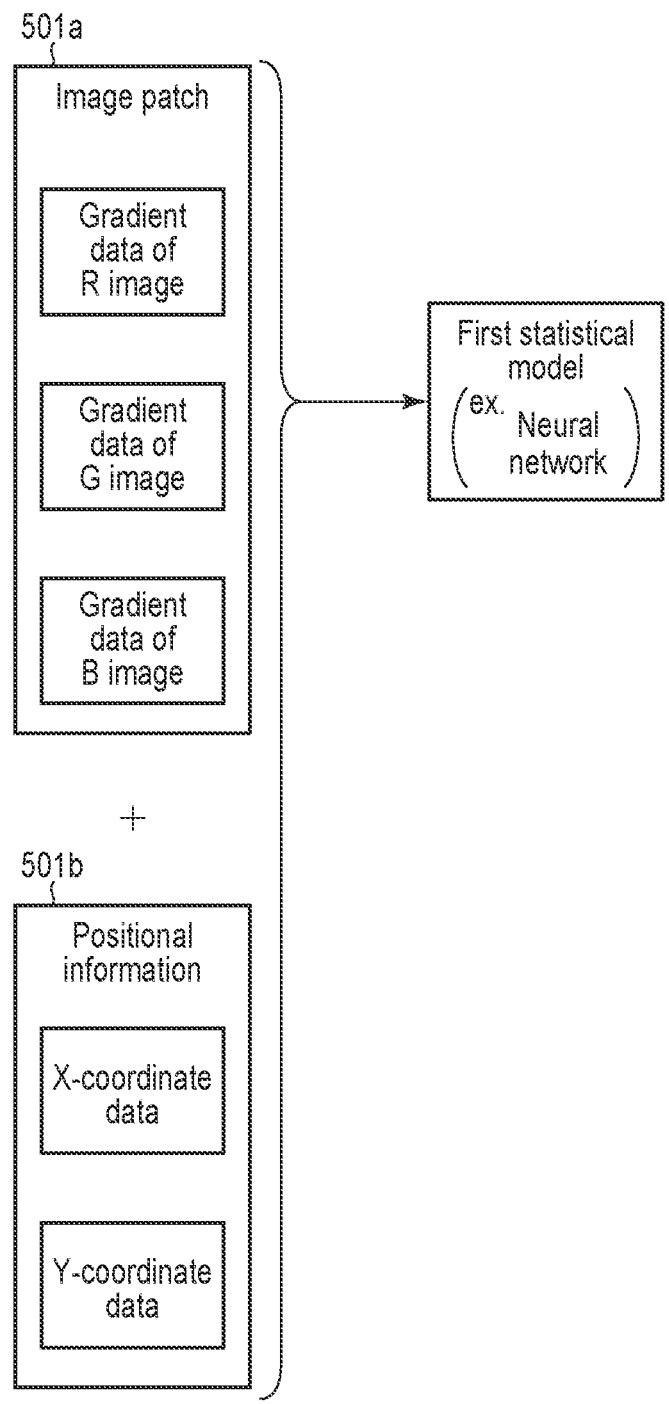
F I G. 15

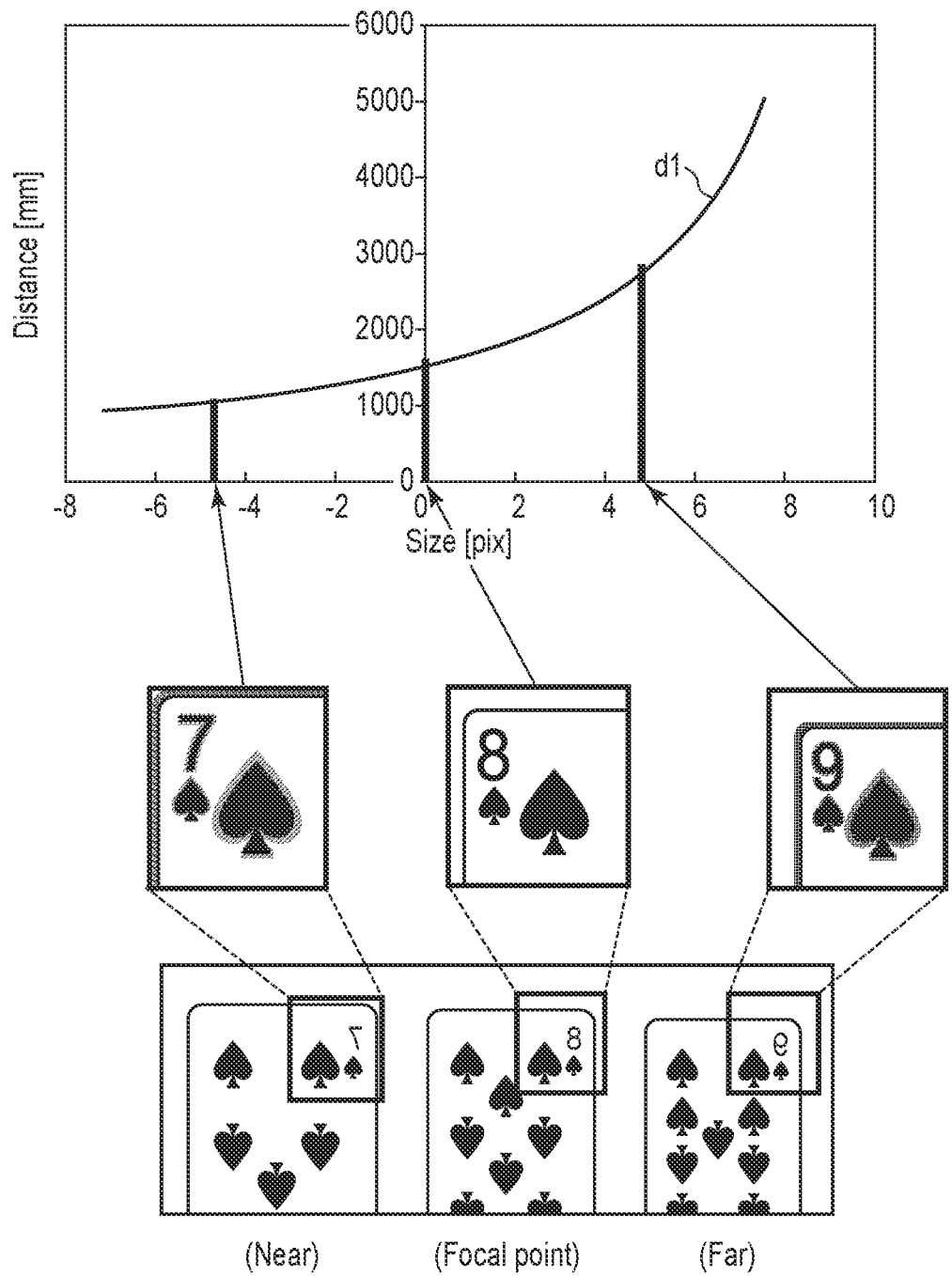
F I G. 17

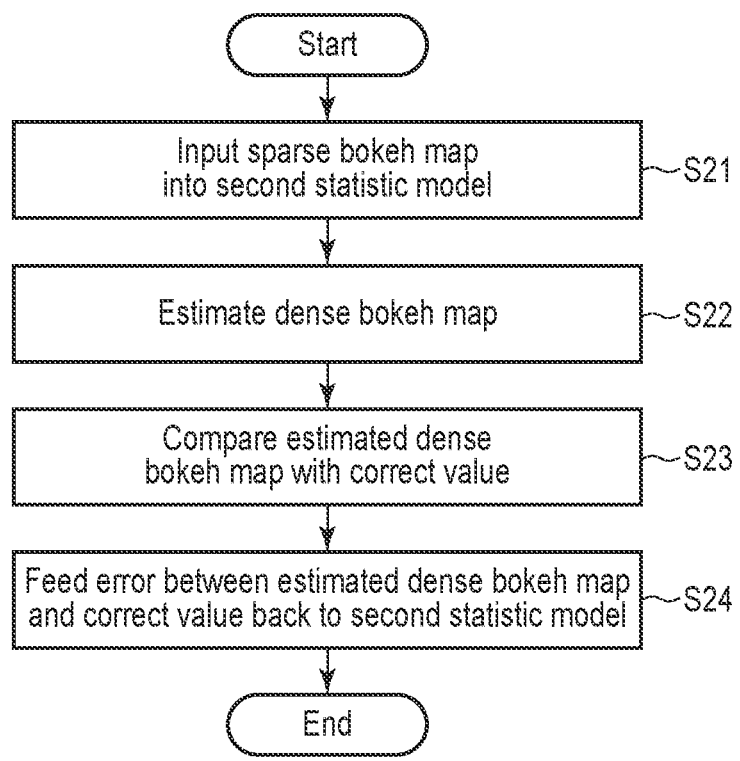
F I G. 22

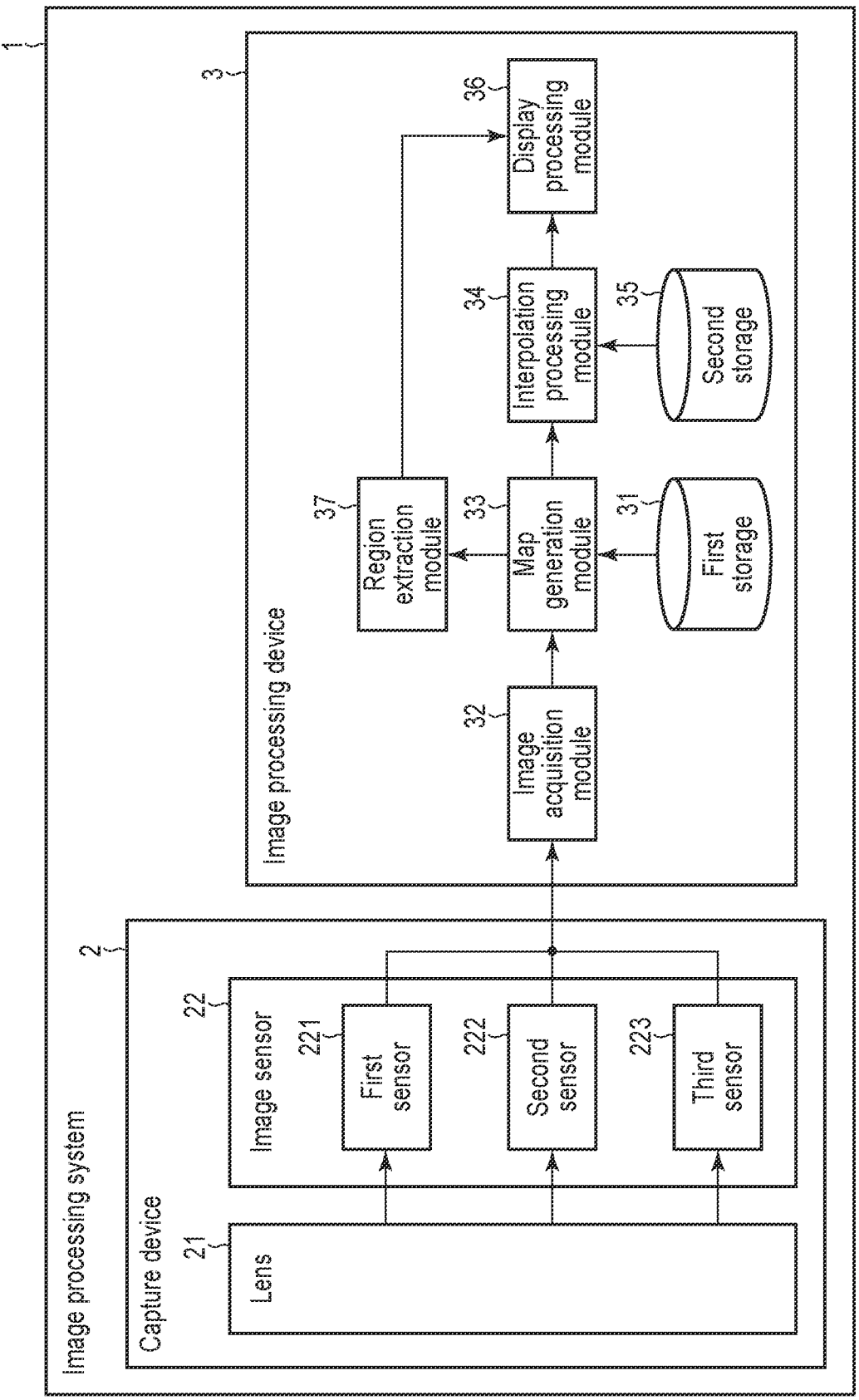
F I G. 23

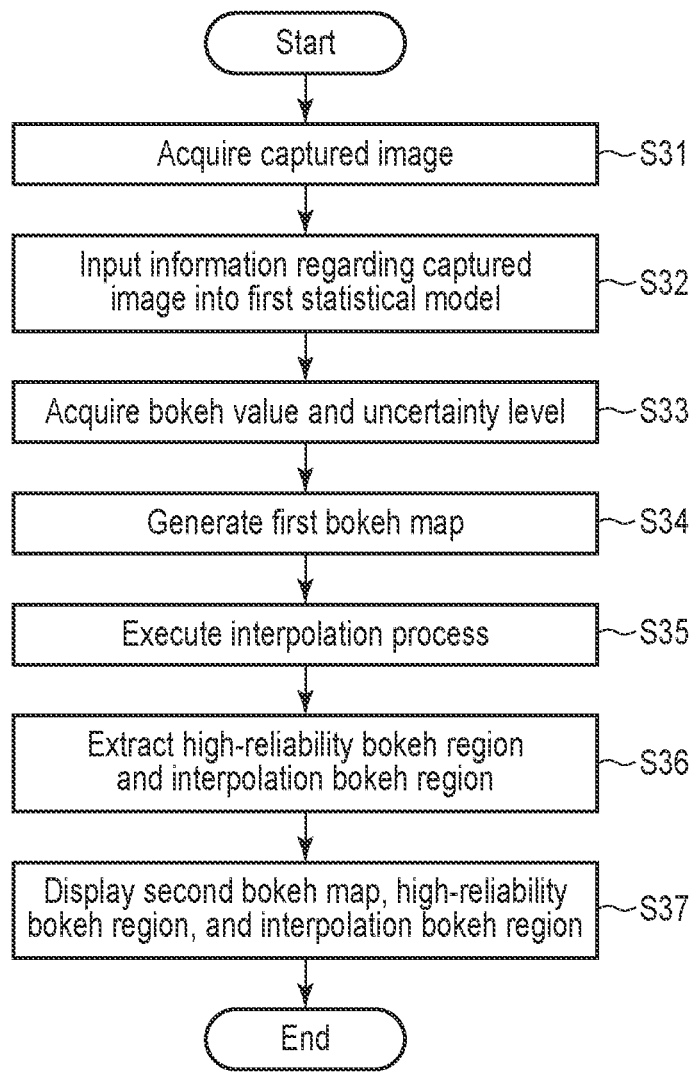
F I G. 24

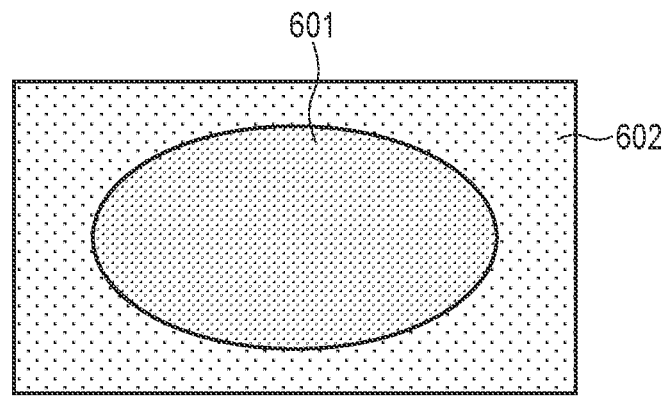
F I G. 25
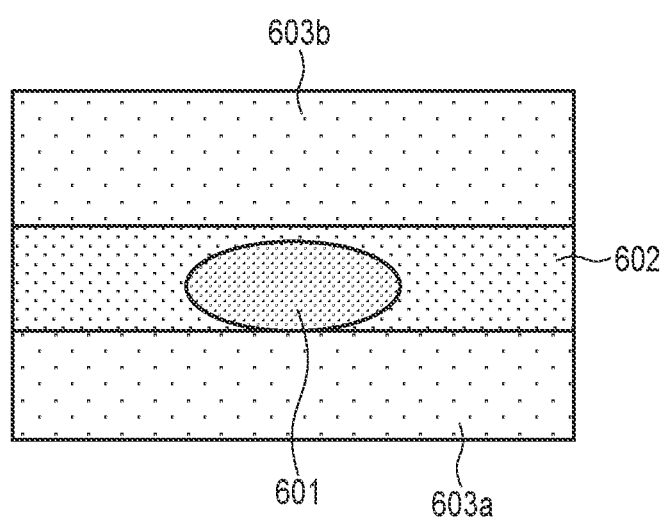
F I G. 26

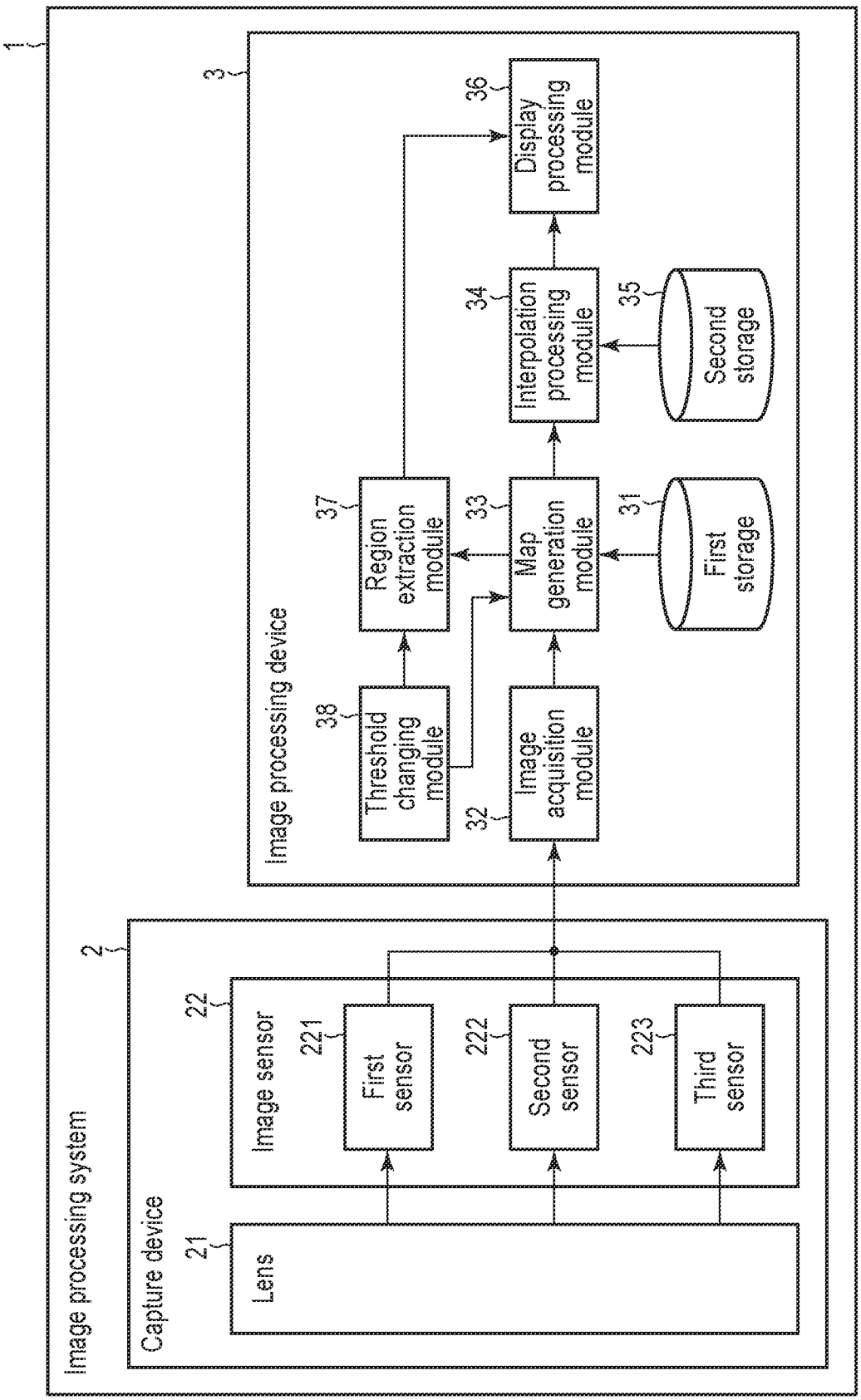
F I G. 27

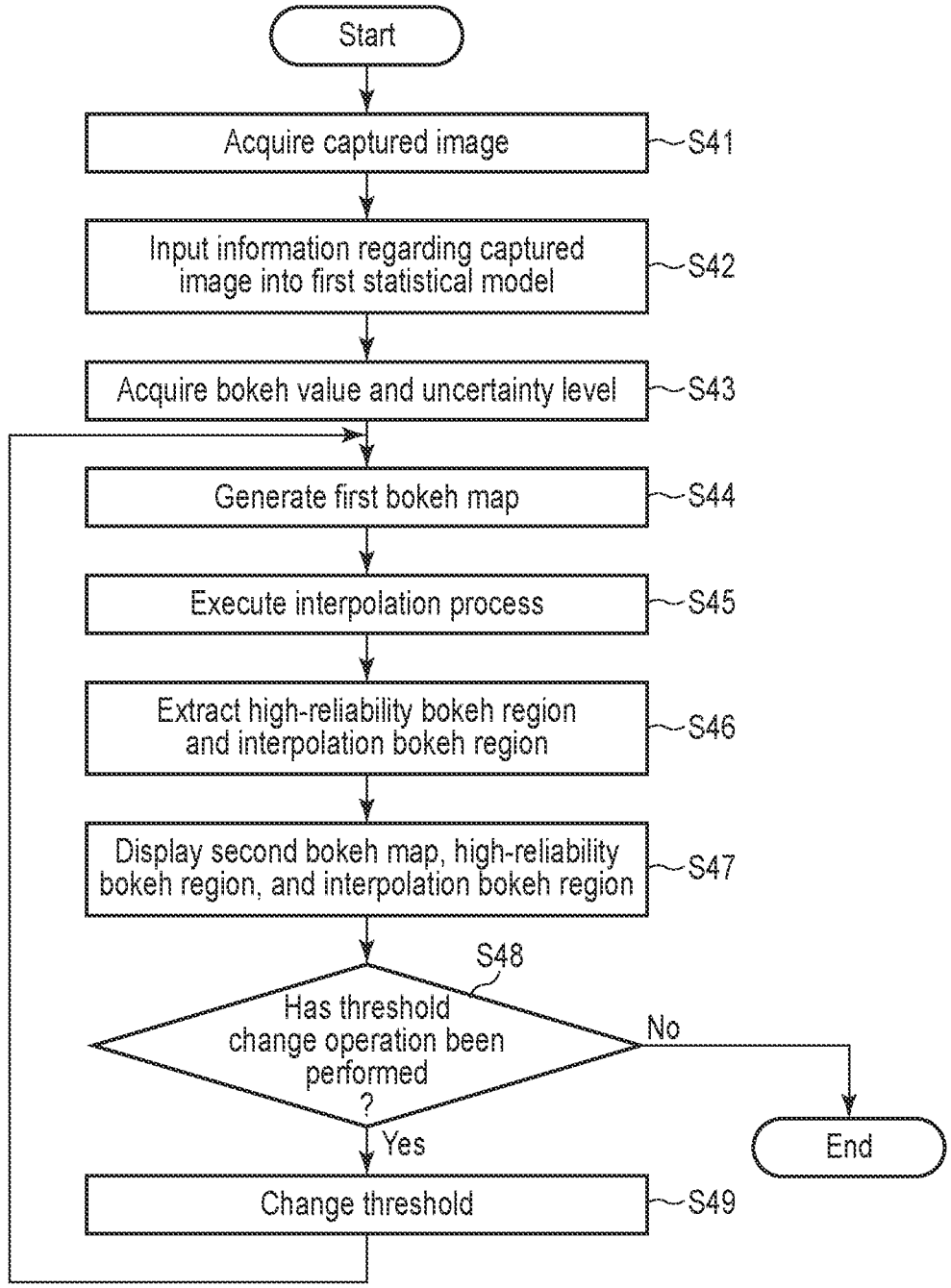
F I G. 28

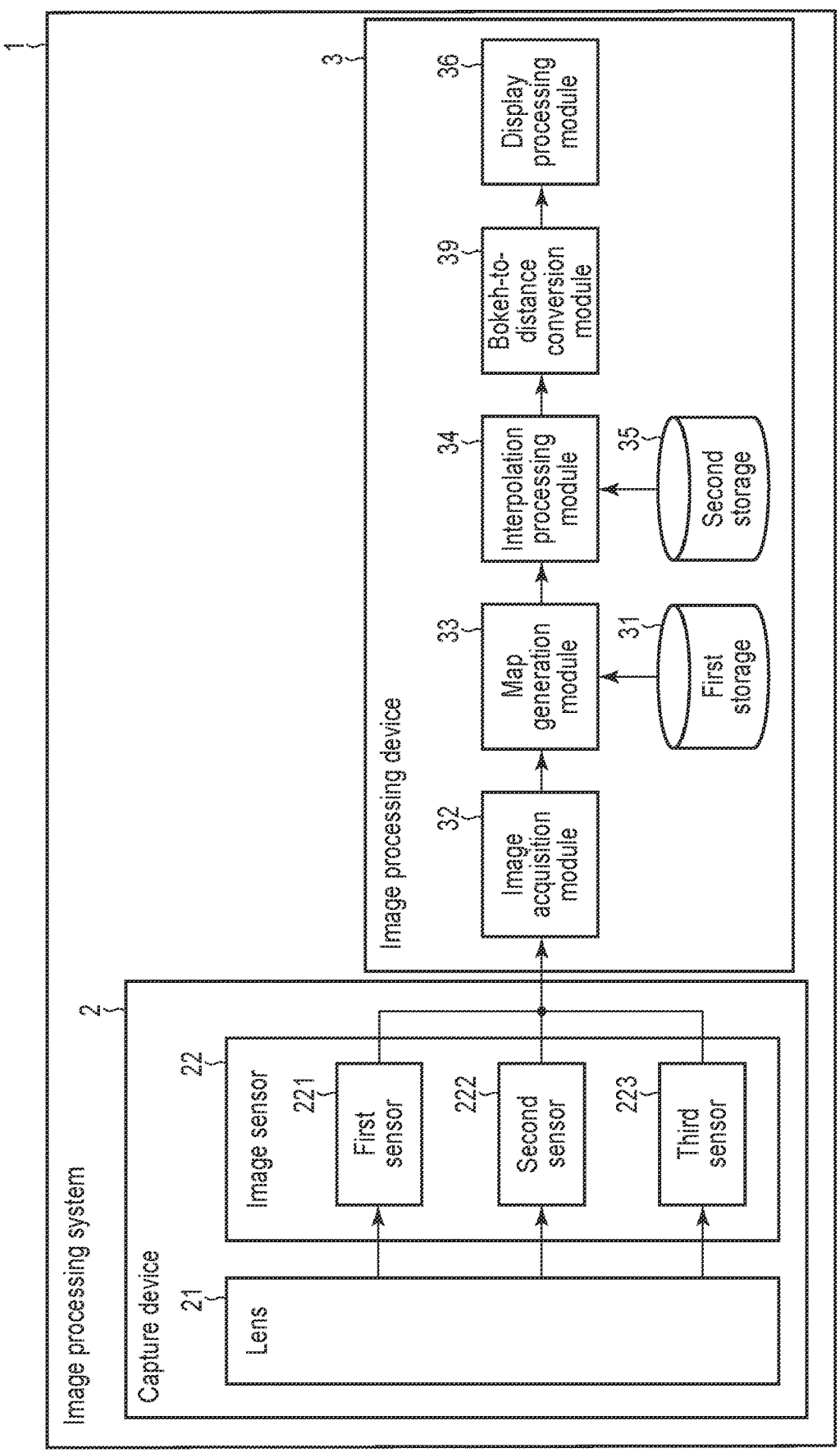
F I G. 31

IMAGE PROCESSING DEVICE, METHOD, AND STORAGE MEDIUM

CROSS-REFERENCE TO RELATED APPLICATIONS

This application is based upon and claims the benefit of priority from Japanese Patent Application No. 2021-043145, filed Mar. 17, 2021, the entire contents of which are incorporated herein by reference.

FIELD

Embodiments described herein relate generally to an image processing device, a method, and a storage medium.

BACKGROUND

In general, a technique for using images captured by two capture devices (cameras) or a stereo camera (compound-eye camera) in order to acquire a distance to a subject. In recent years, however, a technology for estimating a distance to a subject from an image captured by one capture device (monocular camera) has been disclosed.

The distance to the subject estimated in this manner is useful to grasp a three-dimensional structure of the subject included in the image captured by the capture device.

However, in the case where the distance to the subject is estimated from the image captured by one capture device as described above, a region where a distance cannot be accurately estimated is present depending on an image, and there is a case where it is difficult to appropriately grasp the three-dimensional structure of the subject.

Meanwhile, it is conceivable to interpolate the distance to the subject included in the region where the distance cannot be estimated using a distance measuring device, such as LiDAR, but it takes cost to prepare the distance measuring device. Since the installation volume of the distance measuring device is large, it is not easy to use the distance measuring device in combination with the capture device.

BRIEF DESCRIPTION OF THE DRAWINGS

FIG. 1 is a diagram illustrating an exemplary configuration of an image processing system including an image processing device according to a first embodiment.

FIG. 5 is a diagram illustrating the relationship between a distance to a subject and bokeh that occurs in an image due to chromatic aberration in a case where an achromatic lens is used.

FIG. 6 is a diagram illustrating the relationship between a size of an aperture of a diaphragm mechanism included in an optical system of the capture device and a PSF shape.

FIG. 14 is a diagram for describing a second method of estimating bokeh from an image.

FIG. 15 is a diagram illustrating exemplary information to be input into the first statistical model in the second method.

FIG. 16 is a diagram for describing a third method of estimating bokeh from an image.

FIG. 17 is a diagram for specifically describing a correlation between bokeh occurring in an image and a distance to a subject in the image.

FIG. 22 is a flowchart illustrating an exemplary processing procedure of the learning process of the second statistical model.

FIG. 23 is a diagram illustrating an exemplary configuration of an image processing system including an image processing device according to a second embodiment.

FIG. 24 is a flowchart illustrating an exemplary processing procedure of the image processing device.

FIG. 25 is a diagram illustrating examples of a high-reliability bokeh region and an interpolation bokeh region.

FIG. 26 is a diagram for describing an out-of-analysis-range region.

FIG. 27 is a diagram illustrating an exemplary configuration of an image processing system including an image processing device according to a third embodiment.

FIG. 28 is a flowchart illustrating an exemplary processing procedure of the image processing device.

FIG. 31 is a diagram illustrating an exemplary configuration of an image processing system including an image processing device according to a fourth embodiment.

DETAILED DESCRIPTION

Figure 2:
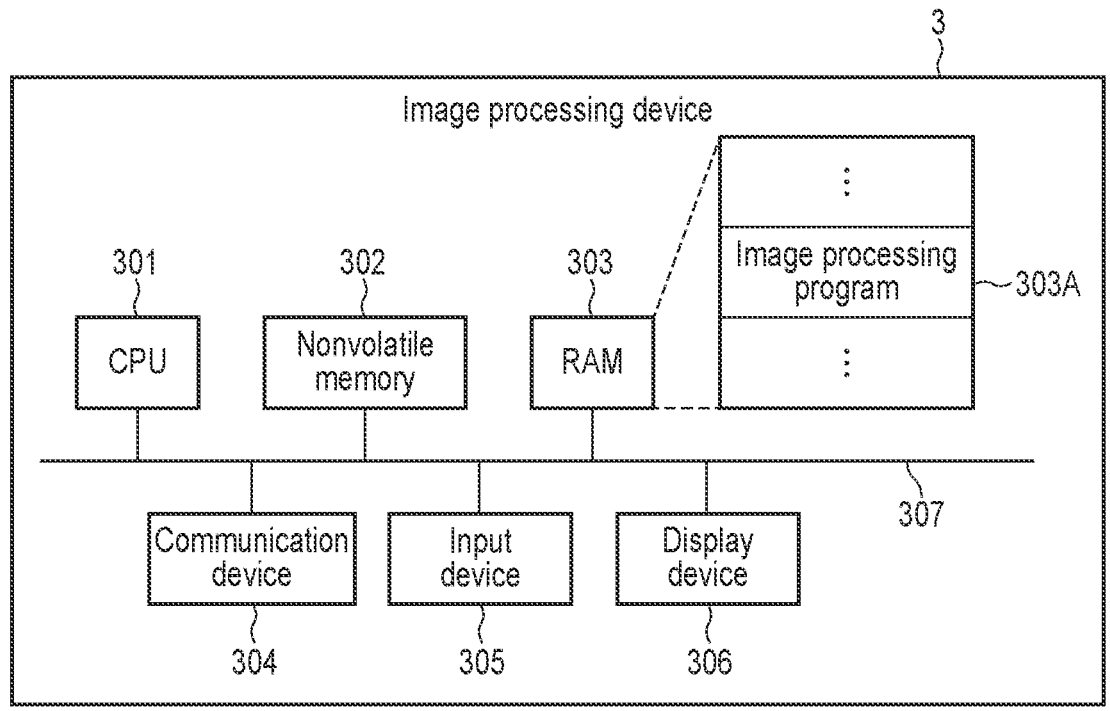
FIG. 2 is a diagram illustrating an exemplary system configuration of the image processing device.

In general, according to one embodiment, an image processing device includes first storage and a processor. The first storage is configured to store a first statistical model generated by learning bokeh which occurs in a first image affected by aberration of a first optical system, and varies non-linearly in accordance with a distance to a subject in the first image. The processor is configured to acquire a second image affected by aberration of a second optical system. The processor is configured to acquire a bokeh value which indicates bokeh occurring in the acquired second image and an uncertainty level which indicates a level of uncertainty for the bokeh value. The bokeh value and the uncertainty level are output from the first statistical model by inputting the second image into the first statistical model. The processor is configured to generate a first bokeh map based on the acquired bokeh value and uncertainty level. The processor is configured to acquire a second bokeh map obtained by interpolating a bokeh value with respect to the first bokeh map.

Each embodiment will be described with reference to the drawings hereinafter.

First Embodiment

First, a first embodiment will be described.

FIG. 1 is a diagram illustrating an exemplary configuration of an image processing system including an image processing device according to the present embodiment. An image processing system 1 illustrated in FIG. 1 is used to capture an image and grasp a three-dimensional structure of a subject in the image using the captured image.

As illustrated in FIG. 1, the image processing system 1 includes a capture device 2 and an image processing device 3. In the present embodiment, a description will be given assuming that the image processing system includes the capture device 2 and the image processing device 3 which are separate devices. However, the image processing system 1 may be implemented as one device in which the capture device 2 functions as an image capturing unit and the image processing device 3 functions as an image processing unit. When the image processing system 1 includes the capture device 2 and the image processing device 3 which are separate devices, for example, a digital camera or the like can be used as the capture device 2, and a personal computer, a smartphone, a tablet computer, or the like can be used as the image processing device 3. In this case, the image processing device 3 may operate as, for example, a server device that executes a cloud computing service. On the other hand, when the image processing system 1 is implemented as one device, a digital camera, a smartphone, a tablet computer, or the like can be used as the image processing system 1.

The capture device 2 is used to capture various images. The capture device 2 includes a lens 21 and an image sensor 22. The lens 21 and the image sensor 22 correspond to an optical system of the capture device 2 (monocular camera). In the present embodiment, the lens 21 form a lens unit together with a mechanism, a lens drive circuit, and the like for adjusting a position of the lens 21 to control a focal point (in-focus distance), a diaphragm mechanism, a diaphragm control circuit, and the like having an aperture for adjusting the quantity of light (incident light quantity) taken into the optical system of the capture device 2, and a control circuit or the like on which a memory or the like (not illustrated) holding information regarding the lens 21 and a parameter thereof in advance is mounted.

In the present embodiment, the capture device 2 may be configured such that the lens 21 (lens unit) can be manually replaced with another lens. In this case, a user can attach one of a plurality of types of lenses, such as a standard lens, a telephoto lens, and a wide-angle lens, to the capture device 2 for use. Note that replacement with a lens causes a focal length and an f-number (aperture value) to vary so that an image can be captured in accordance with the lens used in the capture device 2.

In the present embodiment, the focal length means the distance from the lens to the position at which parallel light that has entered the lens converges. The f-number results from numerical conversion of the quantity of light to be taken in the capture device 2 in accordance with the diaphragm mechanism. Note that, as the f-number decreases in value, the quantity of light to be taken in the capture device 2 increases (namely, the aperture increases in size).

Light reflected on the subject enters the lens 21. The light having entered the lens 21 passes through the lens 21. The light having passed through the lens 21 reaches the image sensor 22, so that the image sensor 22 receives (detects) the light. The image sensor 22 converts (photoelectrically converts) the received light into an electric signal to generate an image of a plurality of pixels.

Note that, for example, the image sensor 22 is achieved by a charge coupled device (CCD) image sensor or a complementary metal oxide semiconductor (CMOS) image sensor. For example, the image sensor 22 includes a first sensor (R sensor) 221 that detects light in a red (R) wavelength band, a second sensor (G sensor) 222 that detects light in a green (G) wavelength band, and a sensor (B sensor) 223 that detects light in a blue (B) wavelength band. The image sensor 22 can receive light in the wavelength bands corresponding to the first to third sensors 221 to 223, and generate sensor images (R image, G image, and B image) corresponding to the respective wavelength bands (color components). That is, the image captured by the capture device 2 is a color image (RGB image), and the image includes the R image, the G image, and the B image.

Note that the image sensor 22 including the first to third sensors 221 to 223 will be described in the present embodiment. However, the image sensor 22 needs to include at least one of the first to third sensors 221 to 223. Further, the image sensor 22 may include a sensor for generation of a monochrome image, instead of including the first to third sensors 221 to 223.

In the present embodiment, the image generated based on the light having passed through the lens 21 is the image that has been affected by the aberration of (lens 21 included in) the optical system, and thus, includes bokeh due to the aberration. Note that the bokeh that occurs in the image will be described in detail below.

The image processing device 3 includes first storage 31, an image acquisition module 32, a map generation module 33, an interpolation processing module 34, second storage 35, and a display processing module 36 as functional configurations.

The first storage 31 stores statistical information (hereinafter, referred to as a first statistical model) used to acquire a distance to a subject from the image captured by the capture device 2. The first statistical model is generated by learning of bokeh that occurs in an image (first image) affected by aberration of the optical system and varies non-linearly in accordance with the distance to the subject in the image.

Note that the first statistical model can be generated by application of various known machine learning algorithms, such as a neural network and a random forest. Examples of the neural network applicable in the present embodiment may include a convolutional neural network (CNN), a fully connected neural network, and a recurrent neural network.

The image acquisition module 32 acquires an image (second image) captured by the capture device 2 from the capture device 2 (image sensor 22).

Here, it is assumed that the first statistical model stored in the first storage 31 described above is constructed to estimate (predict) a bokeh value indicating the bokeh occurring in the image in accordance with the distance to the subject included in the input image and calculate an uncertainty level indicating a level of uncertainty of the bokeh value although details will be described later. In other words, when an image is input into the first statistical model, the bokeh value and the uncertainty level corresponding to the image are output from the first statistical model.

The map generation module 33 inputs the image acquired by the image acquisition module 32 into the first statistical model stored in the first storage 31, thereby acquiring a bokeh value indicating the bokeh occurring in the image output from the first statistical model and the uncertainty level corresponding to the bokeh value. The map generation module 33 generates a bokeh map based on the acquired bokeh value and uncertainty level.

The interpolation processing module 34 acquires a bokeh map obtained by interpolating the bokeh value with respect to the bokeh map generated by the map generation module 33.

The second storage 35 stores statistical information (hereinafter, referred to as a second statistical model) used to interpolate the bokeh value with respect to the bokeh map generated by the map generation module 33. Note that the second statistical model can be generated by application of various known machine learning algorithms, such as a neural network and a random forest similarly to the above-described first statistical model.

The display processing module 36 displays the bokeh map (bokeh map in which the bokeh value has been interpolated) acquired by the interpolation processing module 34.

FIG. 2 illustrates an example of a system configuration of the image processing device 3 illustrated in FIG. 1. As illustrated in FIG. 2, the image processing device 3 includes a CPU 301, a nonvolatile memory 302, a RAM 303, a communication device 304, an input device 305, a display device 306, and the like. The image processing device 3 further includes a bus 307 that connects the CPU 301, the nonvolatile memory 302, the RAM 303, the communication device 304, the input device 305, and the display device 306 to each other.

The CPU 301 is a processor configured to control operations of various components in the image processing device 3. The CPU 301 may be a single processor or may be formed of a plurality of processors. The CPU 301 executes various programs loaded from the nonvolatile memory 302 to the RAM 303. Examples of the programs include an operating system (OS) and various application programs. The application program includes an image processing program 303A.

The nonvolatile memory 302 is a storage medium for use as an auxiliary storage. The RAM 303 is a storage medium for use as a main storage. Although only the nonvolatile memory 302 and the RAM 303 are illustrated in FIG. 2, the image processing device 3 may include a different storage, such as a hard disk drive (HDD) and a solid state drive (SSD).

In the present embodiment, the first storage 31 and the second storage 35 illustrated in FIG. 1 are implemented by, for example, the nonvolatile memory 302 or another storage device.

In the present embodiment, some or all of the image acquisition module 32, the map generation module 33, the interpolation processing module 34, and the display processing module 36 illustrated in FIG. 1 are implemented by causing the CPU 301 (namely, the computer of the image processing device 3) to execute the image processing program 303A, that is, by software. The image processing program 303A may be distributed in the state of being stored in a computer-readable storage medium, or may be downloaded to the image processing device 3 through a network. Note that some or all of these modules 32 to 34 and 36 may be implemented by hardware such as an integrated circuit (IC), or may be implemented by a combination of software and hardware.

The communication device 304 is a device configured to perform wired communication or wireless communication. The communication device 304 executes communication or the like with an external device via a network. The external device includes the capture device 2. In this case, the image processing device 3 receives an image from the capture device 2 via the communication device 304.

Examples of the input device 305 include a mouse, a keyboard, and the like. Examples of the display device 306 include a liquid crystal display (LCD) and the like. Note that the input device 305 and the display device 306 may be integrally configured as, for example, a touch screen display.

Figure 3:
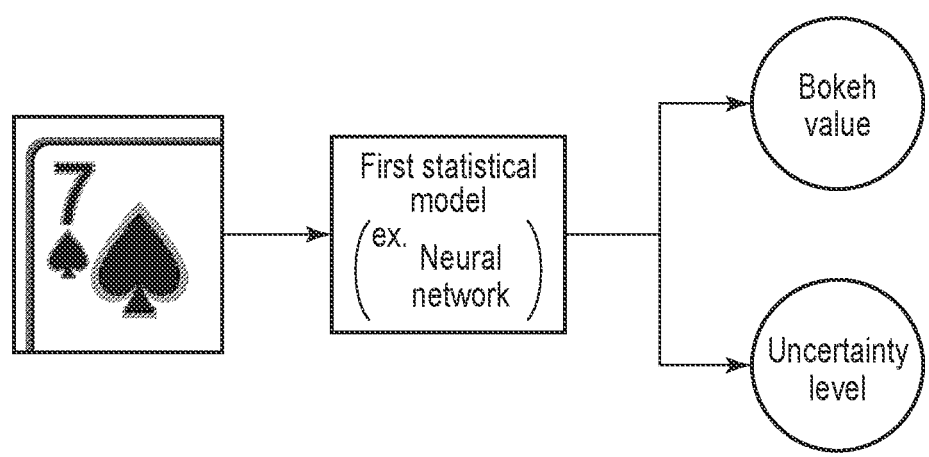
FIG. 3 is a diagram for describing an outline of a first statistical model.

Next, an outline of the first statistical model in the present embodiment will be described with reference to FIG. 3. In the present embodiment, the image affected by the aberration of the optical system (lens 21) is generated by the capture device 2 (image sensor 22), and the image is input into the first statistical model stored in the first storage 31 as described above.

According to the first statistical model in the present embodiment, the bokeh value (bokeh information) indicating the bokeh occurring in the image is estimated in accordance with the distance to the subject in the input image as described above, and the bokeh value is output.

According to the first statistical model in the present embodiment, the uncertainty level corresponding to the bokeh value indicating the bokeh occurring in the image is calculated as described above, and the uncertainty level is output. The first statistical model can perform learning so as to output uncertainty of prediction (bokeh value) by using Bayesian inference, for example. Further, in a case where the first statistical model is configured using a random forest, a variance (prediction value variation error) may be used. Note that a method of calculating the uncertainty level is not limited to a specific method, and various known methods can be applied.

In the present embodiment, the bokeh map is generated based on the bokeh value and the uncertainty level output from the first statistical model as described above.

Here, in the present embodiment, the image captured by the capture device 2 includes bokeh due to the aberration of the optical system (lens aberration) of the capture device 2 as described above. The bokeh that occurs in the image captured by the capture device 2, will be described below. First, chromatic aberration, related to the bokeh due to the aberration of the optical system of the capture device 2, will be described.

Figure 4:
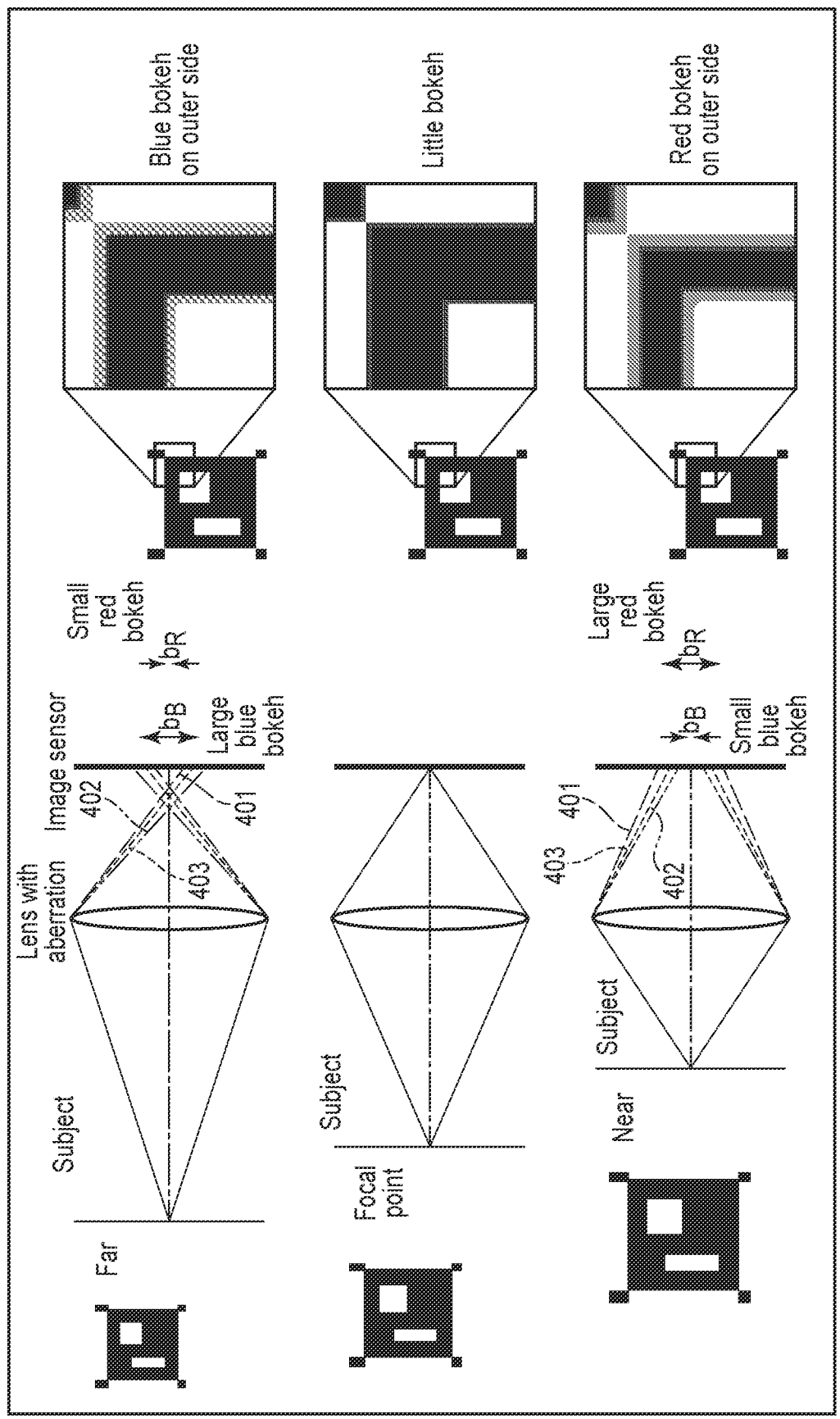
FIG. 4 is a diagram illustrating the relationship between a distance to a subject and bokeh that occurs in an image due to chromatic aberration in a case where a single lens is used.

FIG. 4 illustrates the relationship between the distance to the subject and the bokeh that occurs in the image due to the chromatic aberration. In the following description, the in-focus position in the capture device 2 is referred to as the focal point.

The refractive index of the lens 21 having aberration varies every wavelength band of light to pass therethrough. Thus, for example, in a case where the position of the subject is shifted from the focal point, the respective rays of light in the wavelength bands do not converge to one point and thus reach different points. As a result, the chromatic aberration (bokeh) appears on the image.

FIG. 4 illustrates, on the upper side thereof, a case where the position of the subject is far from the capture device 2 (image sensor 22) with respect to the focal point (namely, the position of the subject is on the far side of the focal point).

In this case, regarding light 401 in the red wavelength band, the image sensor 22 (first sensor 221) generates an image including a relatively small bokeh $b_R$. Meanwhile, regarding light 402 in the blue wavelength band, the image sensor 22 (third sensor 223) generates an image including a relatively large bokeh $b_B$. Note that, regarding the light 403 in the green wavelength band, an image including bokeh intermediate in size between the bokeh $b_R$ and the bokeh $b_B$ is generated. Therefore, in the image captured with the position of the subject far with respect to the focal point, blue bokeh is observed outside the subject in the image.

Meanwhile, FIG. 4 illustrates, on the lower side thereof, a case where the position of the subject is near to the capture device 2 (image sensor 22) with respect to the focal point (namely, the position of the subject is on the near side of the focal point).

In this case, regarding the light 401 in the red wavelength band, the image sensor 22 (first sensor 221) generates an image including a relatively large bokeh $b_R$. Meanwhile, regarding the light 402 in the blue wavelength band, the image sensor 22 (third sensor 223) generates an image including a relatively small bokeh $b_B$. Note that, regarding the light 403 in the green wavelength band, an image including bokeh intermediate in size between the bokeh $b_R$ and the bokeh $b_B$ is generated. Therefore, in the image captured with the position of the subject near with respect to the focal point, a red bokeh is observed outside the subject in the image.

Here, FIG. 4 illustrates the example in which the lens 21 that is the simple single lens. However, for example, a lens subjected to chromatic aberration correction (hereinafter, referred to as an achromatic lens) is used in the capture device 2 in general. Note that the achromatic lens is a combination of a low-dispersion convex lens and a high-dispersion concave lens and is smallest in the number of lenses among lenses for correction of chromatic aberration.

FIG. 5 illustrates the relationship between the distance to the subject and the bokeh that occurs in the image due to the chromatic aberration in a case where the achromatic lens is used as the lens 21. Although the achromatic lens is designed to have the focal point constant between blue wavelength and red wavelength, the chromatic aberration cannot be eliminated completely. Thus, in a case where the position of the subject is far with respect to the focal point, green bokeh occurs as illustrated on the upper side of FIG. 5. In a case where the position of the subject is near with respect to the focal point, purple bokeh occurs as illustrated on the lower side of FIG. 5.

Note that FIGS. 4 and 5 each illustrate, on the middle side thereof, a case where the position of the subject to the capture device 2 (image sensor 22) coincides with the focal point. In each case, the image sensor 22 (first to third sensors 221 to 223) generates an image having bokeh less in amount.

Here, because the diaphragm mechanism is provided in the optical system (lens unit) of the capture device 2 as described above, the shape of the bokeh that occurs in the image captured by the capture device 2 varies due to the size of the aperture of the diaphragm mechanism. Note that the shape of the bokeh is referred to as a point spread function (PSF) shape, and indicates the diffusion distribution of light that occurs at the time of capturing of a point light source.

FIG. 6 illustrates, from left on the upper side thereof, the PSF shape that occurs in the central portion of the image captured by the capture device 2 including a lens having a focal length of 50 mm with the focal point and the f-number (aperture) that are 1500 mm and F1.8, respectively, in (the optical system of) the capture device 2, in order of the position of the subject closer to the capture device 2. FIG. 6 illustrates, from left on the lower side thereof, the PSF shape that occurs in the central portion of the image captured by the capture device 2 including a lens having a focal length of 50 mm with the focal point and the f-number (aperture) that are 1500 mm and F4, respectively, in (the optical system of) the capture device 2, in order of the position of the subject closer to the capture device 2. Note that FIG. 6 illustrates, at the center on each of the upper side and the lower side thereof, the PSF shape in a case where the position of the subject coincides with the focal point.

The respective PSF shapes illustrated at the corresponding positions on the upper side and the lower side of FIG. 6 are identical in the position of subject to the capture device 2. However, even in a case where identification is satisfied in the position of subject, the PSF shape on the upper side (PSF shape that occurs in the image captured with the f-number being F1.8) and the PSF shape on the lower side (PSF shape that occurs in the image captured with the f-number being F4) are different in shape.

Further, as indicated in the PSF shape on the leftmost side of FIG. 6 and the PSF shape on the rightmost side of FIG. 6, the PSF shapes in a case where the position of the subject is closer than the focal point are different from those in a case where the position of the subject is farther than the focal point even when, for example, the distance from the subject position to the focal point is approximately the same.

Figure 7:
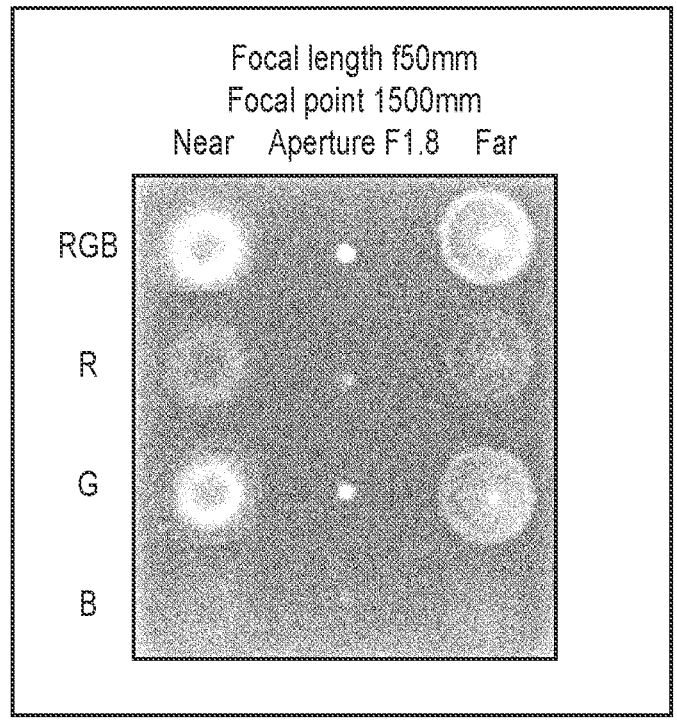
FIG. 7 is a diagram illustrating an exemplary PSF shape that occurs in an image on each channel.
Figure 8:
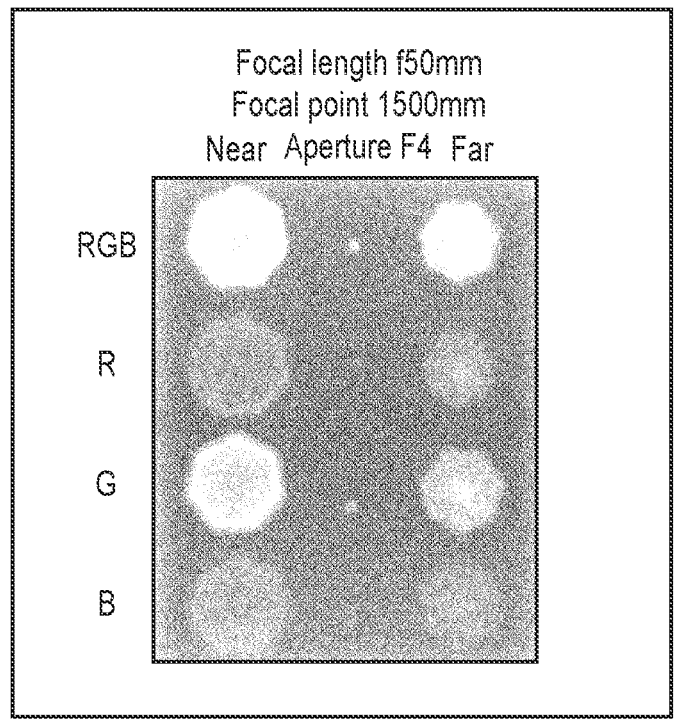
FIG. 8 is a diagram illustrating another exemplary PSF shape that occurs in an image on each channel.

Note that the phenomenon in which the PSF shape varies in accordance with the size of the aperture of the diaphragm mechanism or the position of the subject to the capture device 2 as described above, occurs in each channel (RGB image, R image, G image, and B image), similarly. FIG. 7 separately illustrates a case where the position of the subject is near with respect to the focal point (near side) and a case where the position of the subject is far with respect to the focal point (far side), for the PSF shape that occurs in the image in each channel captured by the capture device 2. In FIG. 7, the capture device 2 includes a lens having a focal length of 50 mm with the focal point and the f-number that are 1500 mm and F1.8. FIG. 8 separately illustrates a case where the position of the subject is near with respect to the focal point and a case where the position of the subject is far with respect to the focal point, for the PSF shape that occurs in the image in each channel captured by the capture device 2. In FIG. 8, the capture device 2 includes a lens having a focal length of 50 mm with the focal point and the f-number that are 1500 mm and F4.

Further, the PSF shape that occurs in the image captured by the capture device 2 varies depending on position in the image.

Figure 9:
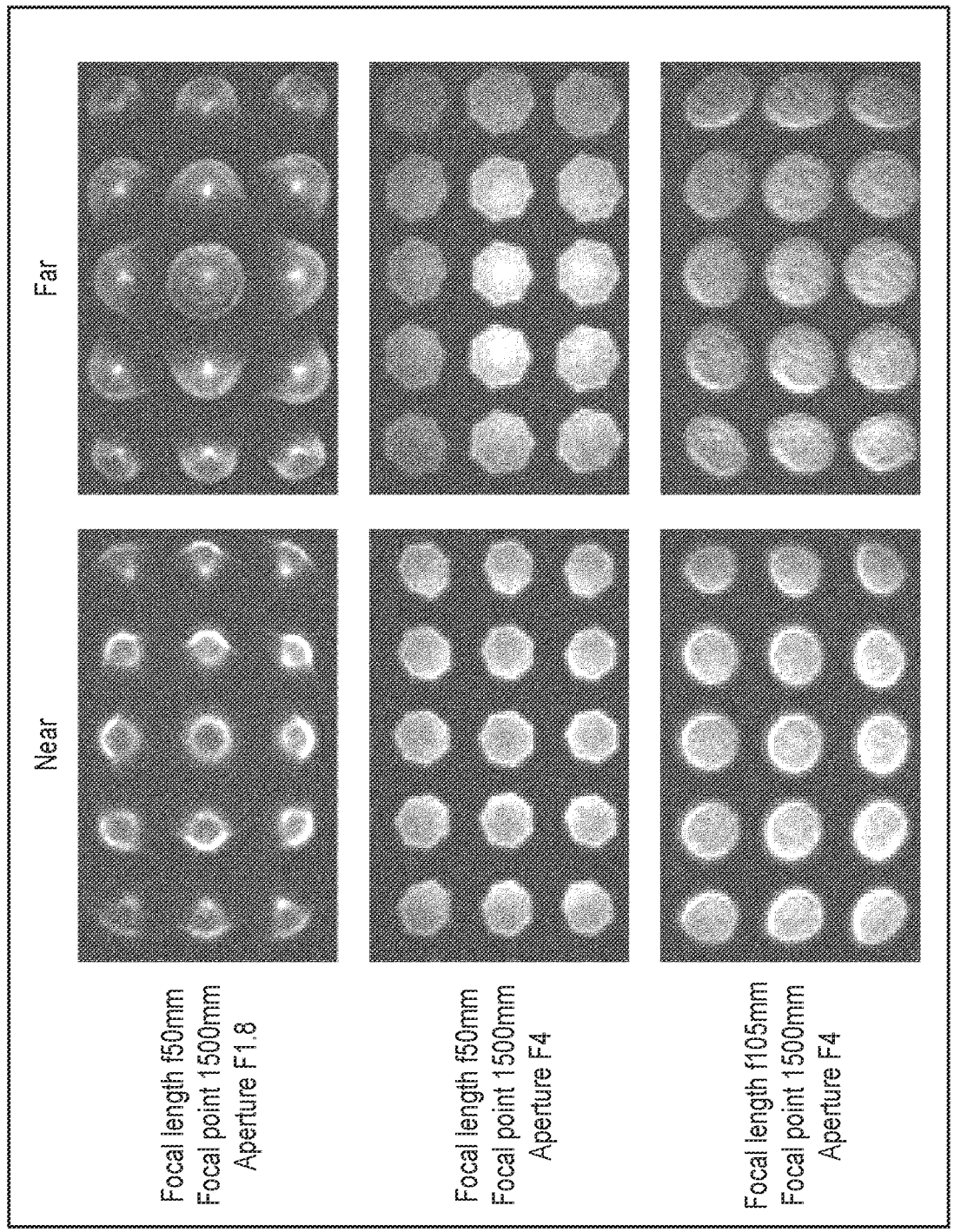
FIG. 9 is a diagram illustrating an exemplary PSF shape that occurs at each position in an image.

FIG. 9 separately illustrates, on the upper side thereof, a case where the position of the subject is near with respect to the focal point and a case where the position of the subject is far with respect to the focal point, for the PSF shape that occurs at each position in the image captured by the capture device 2.

In the upper side of FIG. 9, the capture device 2 includes a lens having a focal length of 50 mm with the focal point and the f-number that are 1500 mm and F1.8.

FIG. 9 separately illustrates, on the middle side thereof, a case where the position of the subject is near with respect to the focal point and a case where the position of the subject is far with respect to the focal point, for the PSF shape that occurs at each position in the image captured by the capture device 2. In the middle side of FIG. 9, the capture device 2 includes a lens having a focal length of 50 mm with the focal point and the f-number that are 1500 mm and F4.

As illustrated on the upper side and the middle side of FIG. 9, for example, in the vicinity of an end portion of the image captured by the capture device 2 (in particular, the vicinity of the upper-left corner portion), a PSF shape different from the PSF shape located in the vicinity of the center of the image can be observed.

FIG. 9 separately illustrates, on the lower side thereof, a case where the position of the subject is near with respect to the focal point and a case where the position of the subject is far with respect to the focal point, for the PSF shape that occurs at each position in the image captured by the capture device 2. In the lower side of FIG. 9, the capture device 2 includes a lens having a focal length of 105 mm with the focal point and the f-number that are 1500 mm and F4.

FIG. 9 illustrates, on the upper side and the middle side thereof, the PSF shape that occurs in the image captured with the same lens. As illustrated on the lower side of FIG. 9, in the case of use of the lens different in focal length, the PSF shape varied in accordance with the lens is observed (PSF shape different from those on the upper side and the middle side of FIG. 9).

Figure 10:
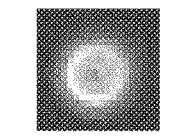
FIG. 10 is a diagram specifically describing the positional dependence of the PSF shape according to each type of lens.

Next, the positional dependence of the PSF shape corresponding to each type of lens (aberration of each lens) for use in the optical system of the capture device 2, will be specifically described with reference to FIG. 10. FIG. 10 illustrates the PSF shapes that occurs in the vicinity of the center of the image (screen center) and in the vicinity of the end portion of the image (screen end) captured with each of a plurality of lenses different in focal length. The PSF shapes are separately illustrated in a case where the position of the subject is near with respect to the focal point and in a case where the position of the subject is far with respect to the focal point.

As illustrated in FIG. 10, the PSF shape that occurs in the vicinity of the center of the image is approximately circular and constant even in a case where types of lenses are different from each other. However, the PSF shape that occurs in the vicinity of the end portion of the image is different in shape from the PSF shape that occurs in the vicinity of the center of the image and varies in characteristic (feature) in accordance with each type of lens. Note that the point that the purple bokeh occurs in the vicinity of the edge of the PSF in a case where the position of the subject is near with respect to the focal point and the green bokeh occurs in the vicinity of the edge of the PSF in a case where the position of the subject is far with respect to the focal point, described in FIG. 5, is satisfied even in a case where types of lenses are different from each other.

FIG. 10 illustrates two examples regarding a lens having a focal length of 50 mm (#1 and #2). The examples are identical in a focal length of 50 mm but are different in lens manufacturer (namely, different in product). The same applies to a lens having a focal length of 85 mm.

Examples of the bokeh that varies non-linearly in accordance with the distance to the subject in the present embodiment as described above include the bokeh that occurs due to the chromatic aberration of the optical system of the capture device 2 described in FIGS. 4 and 5, the bokeh that occurs in accordance with the size of the aperture (namely, the f-number) of the diaphragm mechanism that adjusts the quantity of light to be taken in the optical system of the capture device 2 described in FIGS. 6 to 8, and the bokeh that varies in accordance with position in the image captured by the capture device 2 described in FIGS. 9 and 10.

Figure 11:
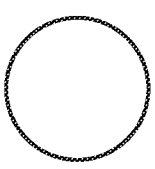
FIG. 11 is a diagram illustrating the relationship between the nonlinearity of the PSF shape and the shape of the aperture of the diaphragm mechanism.

Note that the PSF shape varies depending on the shape of the aperture of the diaphragm mechanism. Here, FIG. 11 illustrates the relationship between the nonlinearity (asymmetry) of the PSF shape and the shape of the aperture of the diaphragm mechanism. The nonlinearity of the PSF shape occurs easily in a case where the shape of the aperture of the diaphragm mechanism is not circular. In particular, the nonlinearity of the PSF shape occurs easily in a case where the shape of the aperture is odd-gonal or in a case where an even-gon is arranged asymmetrically to the horizontal or vertical axis of the image sensor 22.

In the image processing device 3 (image processing system 1) according to the present embodiment, the bokeh value indicating the bokeh occurring in the image is estimated (predicted) using the first statistical model generated by focusing on a point where (a color, a size, and a shape of) the bokeh occurring in the image is a physical clue regarding the distance to the subject. Note that the bokeh value estimated by the first statistical model (namely, output from the first statistical model) in the present embodiment is a scalar quantity representing a bokeh quantity including the color, size, and shape of the bokeh occurring in the image.

Hereinafter, an exemplary method of estimating (the bokeh value indicating) the bokeh from the image by the first statistical model in the present embodiment will be described. Herein, first, second, and third methods will be described.

Figure 12:
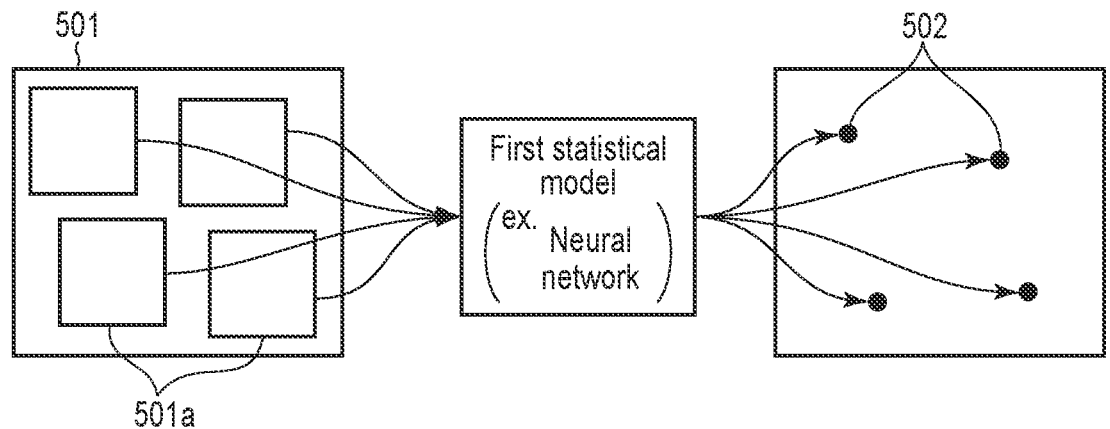
FIG. 12 is a diagram for describing a first method of estimating bokeh from an image.

First, the first method will be described with reference to FIG. 12. In the first method, a local region (image patch) 501*a* is extracted from an image 501.

In this case, for example, the entire region of the image 501 may be divided in a matrix and then each divided partial region may be sequentially extracted as the local region 501*a*. The local region 501*a* may be extracted by recognition of the image 501 such that the region in which the subject (image) is detected is covered. The local region 501*a* may partially overlap another local region 501*a*.

Next, information regarding the local region 501*a* (information of the image 501) is input into the first statistical model for each of the extracted local regions 501*a*, whereby a bokeh value indicating bokeh that occurs in accordance with a distance to a subject in the local region 501*a* is estimated.

The first statistical model in which the information regarding the local region 501*a* is input as above, estimates a bokeh value 502 every pixel of the local region 501*a*.

Here, for example, in a case where a specific pixel belongs to both of a first local region 501*a* and a second local region 501*a* (namely, the pixel is included in the region in which the first local region 501*a* and the second local region 501*a* overlap), a bokeh value estimated with the pixel belonging to the first local region 501*a* and a bokeh value estimated with the pixel belonging to the second local region 501*a* do not necessarily coincide with each other.

Thus, for example, as described above, in a case where a plurality of local regions 501*a* partially overlapping has been extracted, the bokeh value based on a pixel in the region in which the plurality of local regions 501*a* overlaps, may be the average value of, for example, the bokeh value estimated based on the overlapped partial region (pixel) of one local region 501*a* and the distance estimated based on the overlapped partial region (pixel) of the other local region 501*a*. Further, the determination may be made by majority decision based on the distance estimated for each partial region of three or more local regions 501*a* partially overlapping.

Figure 13:
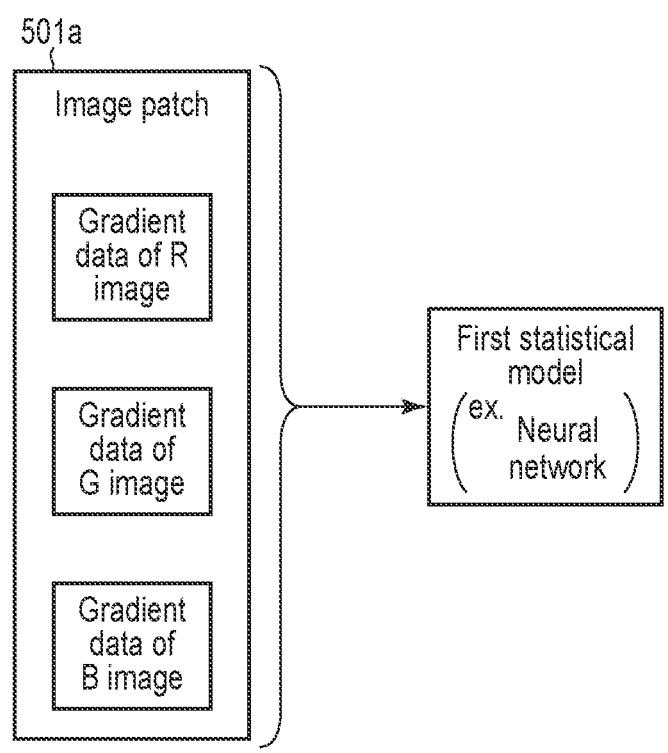
FIG. 13 is a diagram illustrating exemplary information to be input into the first statistical model in the first method.

FIG. 13 illustrates exemplary information regarding the local region 501*a* to be input into the first statistical model in the first method.

As illustrated in FIG. 13, gradient data of the local region 501*a* extracted from the image 501 is input into the first statistical model. The gradient data of the local region 501*a* is generated from each of an R image, a G image, and a B image included in the image 501, and includes gradient data of the R image, gradient data of the G image, and gradient data of the B image.

Note that the gradient data indicates the difference in pixel value (difference value) between each pixel and a pixel adjacent thereto. For example, in a case where the local region 501*a* is extracted as a rectangular region of n pixels (X-axis direction)×m pixels (Y-axis direction), the gradient data is generated in which the difference value calculated between each pixel in the local region 501*a* and, for example, the right adjacent pixel thereto is arranged in a matrix of n rows×m columns.

With the gradient data of the R image, the gradient data of the G image, and the gradient data of the B image, the first statistical model estimates a bokeh value indicating bokeh occurring in each image. FIG. 13 illustrates a case where the gradient data of each of the R image, the G image, and the B image is input into the first statistical model. However, the gradient data of the image 501 (RGB image) may be input into the first statistical model.

Next, the second method will be described with reference to FIG. 14. In the second method, as the information regarding the local region 501*a* in the first method, the gradient data of each local region (image patch) 501*a* and positional information regarding the local region 501*a* in the image 501 are input into the statistical model.

For example, the positional information 501*b* may indicate the central point of the local region 501*a* or may indicate a predetermined side, such as an upper-left side. As the positional information 501*b*, positional information on the image 501 regarding each pixel of the local region 501*a* may be used.

Additional input of the positional information 501*b* into the first statistical model as described above, enables estimation of the bokeh value 502 in consideration of the difference between the bokeh of a subject image formed by light passing through the central portion of the lens 21 and the bokeh of a subject image formed by light passing through the end portion of the lens 21.

That is, the bokeh value can be estimated from the image 501 based on the correlation with the position on the image according to the second method.

FIG. 15 illustrates exemplary information regarding the local region 501*a* to be input into the first statistical model in the second method.

For example, in a case where a rectangular region of n pixels (X-axis direction)×m pixels (Y-axis direction) is extracted as the local region 501*a*, an X-coordinate value (X-coordinate data) on the image 501 corresponding to, for example, the central point of the local region 501*a* and a Y-coordinate value (Y-coordinate data) on the image 501 corresponding to, for example, the central point of the local region 501*a* are acquired.

In the second method, the X-coordinate data and the Y-coordinate data acquired as above are input into the first statistical model, together with the pieces of gradient data of the R image, the G image, and the B image.

Further, the third method will be described with reference to FIG. 16. In the third method, no local region 501*a* is extracted from the image 501, unlike the first method and the second method. In the third method, information regarding the entire region of the image 501 (pieces of gradient data of the R image, the G image, and the B image) are input into the first statistical model.

In comparison with the first method and the second method in which the bokeh value 502 is estimated every local region 501*a*, the third method is likely to increase the uncertainty of estimation of the first statistical model but enables reduction of the load of processing related to the estimation.

In the following description, for convenience, the information to be input into the first statistical model in each of the first, second, and third methods is referred to as information regarding the image.

Although the description has been given herein assuming that the bokeh value is estimated for each pixel, but the bokeh value may be estimated for each predetermined region including at least one pixel.

Further, when the bokeh value is estimated for each pixel in the first statistical model (namely, the bokeh value is output for each pixel) as described above, the first statistical model similarly calculates (outputs) the uncertainty for each pixel.

Hereinafter, the correlation between the bokeh occurring in the image and the distance to the subject in the image in the present embodiment will be specifically described with reference to FIG. 17.

In FIG. 17, the size of the bokeh that occurs in a case where the subject is near with respect to the focal point (near side) is indicated negatively in value on the X axis. Further, in FIG. 17, the size of the bokeh that occurs in a case where the subject is far with respect to the focal point (far side) is indicated positively in value on the X axis. That is, in FIG. 17, the color and size of the bokeh are indicated positively and negatively in value.

FIG. 17 illustrates that the absolute value of the size (pixel) of the bokeh increases as the subject moves away from the focal point in both of the case where the position of the subject is near with respect to the focal point and the case where the position of the subject is far with respect to the focal point.

The example illustrated in FIG. 17 assumes that the focal point is approximately 1500 mm in the optical system in which the image is captured. In this case, for example, the bokeh that is approximately −4.8 pixels in size corresponds to a distance of approximately 1000 mm from the optical system. The bokeh that is 0 pixels in size corresponds to a distance of 1500 mm from the optical system. The bokeh that is approximately 4.8 pixels in size corresponds to a distance of approximately 750 mm from the optical system.

Herein, for convenience, the case where the size (pixel) of the bokeh is indicated on the X axis has been described. As described in FIGS. 6 to 10, the shape of the bokeh (PSF shape) that occurs in the image varies between the case where the subject is near with respect to the focal point and the case where the subject is far with respect to the focal point, and varies depending on position in the image. Thus, the value (bokeh value) indicated on the X axis in FIG. 17 has in practice taken the shape of the bokeh (PSF shape) into account.

The above-described distance to the subject is in correlation with the color, size, and shape of the bokeh as indicated with a line segment d1 of FIG. 17, for example, and thus, estimation of the distance and estimation of (bokeh values indicating) the color, size, and shape of the bokeh are synonymous.

Note that, for example, a configuration in which the first statistical model directly estimates a distance can be considered, but it can be said that the configuration in which the first statistical model estimates the bokeh value can use the same first statistical model even in a case where the focal point (in-focus distance) in the optical system is changed and has high versatility.

Next, an exemplary processing procedure of the image processing device 3 according to the present embodiment will be described with reference to a flowchart of FIG. 18.

First, the capture device 2 (image sensor 22) captures a subject to generate an image (hereinafter, referred to as a captured image) including the subject. This captured image is an image affected by aberration of the optical system (lens 21) of the capture device 2 as described above.

The image acquisition module 32 included in the image processing device 3 acquires the captured image from the capture device 2 (Step S1). Note that the captured image may be acquired (received) from the capture device 2 by executing wired communication using a USB cable, a LAN cable, or the like, or may be acquired (received) from the capture device 2 by executing wireless communication based on Bluetooth (registered trademark) or Wifi (registered trademark).

Next, the map generation module 33 inputs information regarding the captured image acquired in Step S1 to the first statistical model stored in the first storage 31 (Step S2).

In a case where the first method is applied as the method of estimating the bokeh value from the captured image, as the information regarding the captured image, pieces of gradient data of an R image, a G image, and a B image are input into the first statistical model every local region of the captured image.

In a case where the second method is applied as the method of estimating the bokeh value from the captured image, as the information regarding the captured image, the pieces of gradient data of the R image, the G image, and the B image together with the positional information regarding the local region on the image for learning are input into the first statistical model every local region of the captured image.

In a case where the third method is applied as the method of estimating the bokeh value from the captured image, as the information regarding the captured image, pieces of gradient data of R images, G images, and B images of all regions of the captured image are input into the first statistical model.

Note that, in the present embodiment, the description in which the pieces of gradient data of the R image, the G image, and the B image are input into the first statistical model, is given. However, in a case where the bokeh value is estimated from the viewpoint of the shape of the bokeh (PSF shape) that occurs in the captured image, at least one piece of gradient data of the pieces of gradient data of the R image, the G image, and the B image, needs to be input into the first statistical model. Meanwhile, in a case where the bokeh value is estimated from the viewpoint of the color and size of the bokeh that occurs in the captured image due to the chromatic aberration, at least two pieces of gradient data of the pieces of gradient data of the R image, the G image, and the B image, need to be input into the first statistical model.

When the processing in Step S2 is executed, a bokeh value for each pixel is estimated and an uncertainty level corresponding to the bokeh value is calculated in the first statistical model. The estimated bokeh value and the calculated uncertainty level are output from the first statistical model and acquired by the map generation module 33 (Step S3). Next, the map generation module 33 generates a bokeh map (hereinafter, referred to as a first bokeh map) based on the bokeh value and the uncertainty level acquired in Step S3 (Step S4).

Note that the bokeh map in the present embodiment is information in a map format representing the distribution of bokeh occurring in the image affected by the aberration of the optical system. The bokeh map is generated by assigning the bokeh value output for each pixel to each of the pixels constituting the captured image. That is, the bokeh map in the present embodiment corresponds to image data including the same number of pixels as the captured image. In this case, each of the pixels constituting the bokeh map can express the bokeh value assigned to the pixel in a color corresponding to the bokeh value by using the bokeh value assigned to each of the pixels constituting the bokeh map as the pixel value of the pixel.

Here, the map generation module 33 can generate a bokeh map (hereinafter, referred to as an initial bokeh map) based on the bokeh value acquired in Step S3 (the bokeh value estimated by the first statistical model for each of the pixels constituting the captured image). If there is a correlation between (the bokeh value indicating) the bokeh occurring in the image and the distance to the subject in the image and the estimation of the bokeh and the estimation of the distance are synonymous as described above, it can be said that the initial bokeh map in which the bokeh value estimated for each pixel has been assigned to each of pixels as described above is useful information for grasping the three-dimensional structure of the subject.

However, as described above, the bokeh values estimated for the respective pixels include a bokeh value with a high uncertainty level (namely, low reliability), and there is a possibility that the three-dimensional structure of the subject is erroneously grasped in the bokeh map generated using such a bokeh value. Note that non-linear bokeh, which is the physical clue for the distance to the subject, appears strongly at an edge portion in the image in the present embodiment, but it is difficult to estimate (detect) the bokeh, for example, in a textureless region, such as a light-colored table, and high uncertainty is calculated.

Therefore, the map generation module 33 generates the first bokeh map by using the bokeh value with the uncertainty level lower than a threshold among the bokeh values for the respective pixels constituting the captured image acquired in Step S3 (namely, discarding the bokeh value whose uncertainty level is equal to or higher than the threshold).

In this case, the map generation module 33 generates the initial bokeh map described above, and generates an uncertainty map using the uncertainty level for each of the pixels constituting the captured image acquired in Step S3. Note that the uncertainty map is information (image) in a map format representing the distribution of the uncertainty levels corresponding to the bokeh values estimated for the respective pixels constituting the captured image, and is generated by assigning an uncertainty level to a pixel for which the uncertainty level is calculated.

The map generation module 33 can generate the first bokeh map by specifying a region including pixels whose uncertainty on the generated uncertainty map is equal to or higher than a threshold and masking a region of the initial bokeh map corresponding to the specified region. In other words, the first bokeh map is generated by binarizing the uncertainty map with a certain threshold to generate a mask and applying the mask to the initial bokeh map.

Since the above-described first bokeh map is the bokeh map (high-reliability bokeh map) generated using the bokeh value with high reliability (namely, the uncertainty level lower than the threshold), it is possible to reduce the possibility of erroneously grasping the three-dimensional structure of the subject as in the above-described initial bokeh map.

However, the bokeh value estimated for the pixel constituting the region corresponding to, for example, a textureless subject is discarded (namely, the bokeh value with the uncertainty level equal to or higher than the threshold is treated as an outlier or an abnormal value) in the first bokeh map. Thus, it can be said that the first bokeh map is a sparse bokeh map in which only the bokeh value with the uncertainty level lower than the threshold is assigned to the pixel. In such a first bokeh map (sparse bokeh map), the three-dimensional structure of the subject can be only partially expressed, and there is a case where it is difficult to appropriately grasp the three-dimensional structure. It is conceivable to use the image processing system 1 according to the present embodiment, for example, in a case where piping inspection or facility deterioration inspection is performed in a factory, a construction site, or the like, or in a case where a robot or the like grasps a gripping target. However, it is difficult to use the above-described first bokeh map for such an application in which it is necessary to accurately grasp a three-dimensional structure of a subject (target).

Therefore, the interpolation processing module 34 executes a process (interpolation process) of interpolating the bokeh value (discarded bokeh value because the uncertainty level is equal to or higher than the threshold) with respect to the first bokeh map generated in Step S4 described above (Step S5). Note that the second statistical model stored in the second storage 35 is used for the interpolation process in Step S5.

It is assumed that the second statistical model is generated by learning (a data set for learning including) a sparse bokeh map and a dense bokeh map so as to output the dense bokeh map, obtained by interpolating a bokeh value with respect to the sparse bokeh map when the sparse bokeh map, such as the first bokeh map, is input, for example. Note that a correspondence relationship between the sparse bokeh map and the dense bokeh map can be expressed by, for example, a neural network having an encoder/decoder structure, a convolutional network, or the like.

In this case, the interpolation processing module 34 acquires a bokeh map (hereinafter, referred to as a second bokeh map) output from the second statistical model by inputting the first bokeh map generated in Step S4 into the second statistical model. Note that the second bokeh map corresponds to the dense bokeh map in which the bokeh value has been interpolated for a pixel for which an uncertainty level equal to or higher than a threshold is output (calculated) among the plurality of pixels constituting the first bokeh map described above.

If the processing in Step S5 is executed, the display processing module 36 displays the second bokeh map (namely, the dense bokeh map) acquired by executing the processing in Step S5 on, for example, the display device 306 (Step S6). Although the description has been given herein assuming that the second bokeh map is displayed on the display device 306, the second bokeh map may be output (transmitted) to the outside of the image processing device 3 (or the image processing system 1), for example.

Note that the first and second statistical models are used as described above in the present embodiment, but the first and second statistical models are generated by executing a learning process.

Hereinafter, the learning process for generating the first and second statistical models (hereinafter, simply referred to as the learning process of the statistical model) will be briefly described.

Figure 19:
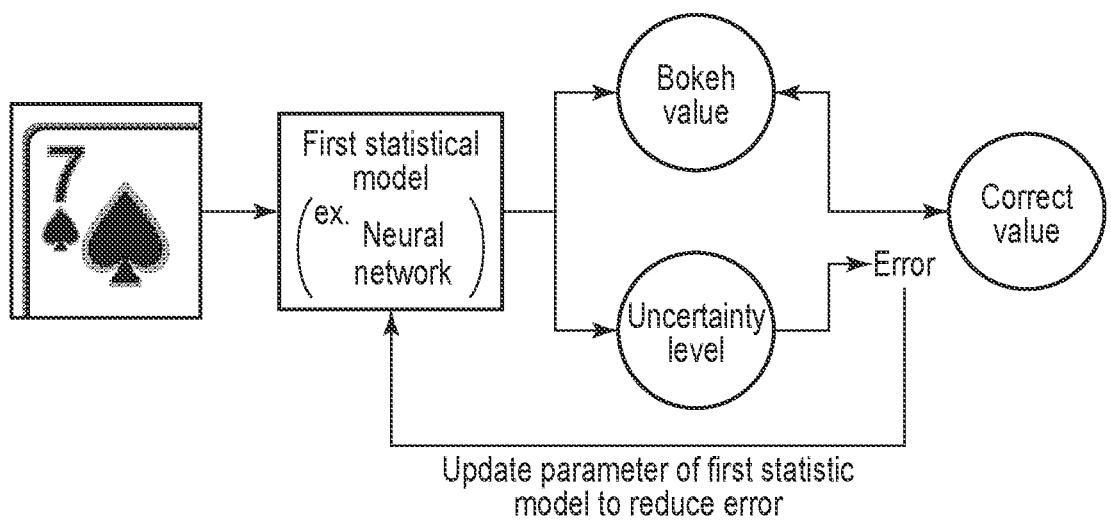
FIG. 19 is a diagram for describing an exemplary learning process of the first statistical model.

First, an exemplary learning process of the first statistical model will be described with reference to FIG. 19. Herein, the learning of the first statistical model with the image captured by the capture device 2 will be described. However, for example, the learning of the first statistical model may be carried out with an image captured by a different device (e.g., a camera) having an optical system similar to the optical system of the capture device 2.

In the following description, the image used for the learning process of the first statistical model is referred to as an image for learning for the sake of convenience.

Even in a case where any method is used from the first method described with reference to FIG. 12, the second method described with reference to FIG. 14, and the third method described with reference to FIG. 16, the learning process of the first statistical model is carried out basically by inputting information regarding an image for learning into the first statistical model and feeding an error between a bokeh value estimated by the first statistical model and a correct value back to the first statistical model. Note that the feedback refers to updating a parameter (for example, weighting factor) of the statistical model (here, the first statistical model) so as to reduce the error.

In a case where the first method is applied as the method of estimating the bokeh value from the above-described image, the information regarding the local region (gradient data) is input into the first statistical model every local region (image patch) extracted from the image for learning even during the learning process of the first statistical model. Accordingly, the bokeh value is estimated based on each pixel in each local region by the first statistical model. The error acquired by comparison between the bokeh value estimated as above and the correct value, is fed back to the first statistical model.

Similarly, in a case where the second method is applied as the method of estimating the bokeh value from the image, gradient data as the information regarding the local region and positional information are input into the first statistical model every local region (image patch) extracted from the image for learning even during the learning process of the first statistical model. Accordingly, the bokeh value is estimated based on each pixel in each local region by the first statistical model. The error acquired by comparison between the bokeh value estimated as above and the correct value, is fed back to the first statistical model.

In a case where the third method is applied as the method of estimating the distance from the image, the information regarding the entire region of the image for learning (gradient data) is collectively input into the first statistical model even during the learning process of the first statistical model. Accordingly, the bokeh value is estimated based on each pixel in the image for learning by the first statistical model. The error acquired by comparison between the bokeh value estimated as above and the correct value, is fed back to the first statistical model.

Note that, in a case where the information regarding the image for learning is input into the first statistical model as described above, it is assumed that the uncertainty level corresponding to the bokeh value is calculated similarly to the case described above with reference to FIG. 3. It is assumed that an error obtained by dividing the error between the bokeh value and the correct value by the square of the uncertainty level is fed back in the learning process of the first statistical model in this case. In this case, the error becomes zero when the uncertainty level is set to infinity, and thus, the square of the uncertainty level is added to the error as a penalty.

According to the learning process of the first statistical model described above, the parameter (for example, weighting factor) of the first statistical model is updated such that a value obtained by correcting the error between the bokeh value and the correct value with the uncertainty level decreases.

Here, for example, in a case where there is no error between the bokeh value estimated by the first statistical model and the correct value but the uncertainty level is high, it can be estimated that there is a possibility that the bokeh value has been estimated by chance. In this case, it is possible to recognize that the learning of the bokeh value (correct value) is insufficient.

When the uncertainty level calculated by the first statistical model is used in this manner, it is also possible to reduce a learning bias.

For example, the first statistical model in the present embodiment is generated by repeatedly carrying out the learning process with the image for learning captured while the distance from the capture device 2 to the subject is varied with the focal point fixed (namely, the image for learning in which the distance to the subject is known). In a case where the learning process has been completed for one focal point, the learning process is carried out similarly for another focal point, so that a higher-accuracy first statistical model can be generated.

Note that the correct value used at the time of learning of the first statistical model in the present embodiment is a bokeh value converted from the actual distance to the subject (namely, bokeh value indicating a color, a size, and a shape of bokeh corresponding to the actual distance) when the image for learning is captured as described above.

Next, an exemplary processing procedure of the learning process of the first statistical model will be described with reference to a flowchart of FIG. 20. Note that, for example, the process illustrated in FIG. 20 may be performed in the image processing device 3 or may be performed in a different device.

First, the information regarding an image for learning previously prepared is input into the first statistical model (step S11). For example, the image for learning is an image generated by the image sensor 22, based on the light having passed through the lens 21 included in the capture device 2, the image being affected by the aberration of the optical system (lens 21) of the capture device 2. Specifically, the image for learning includes the bokeh that varies non-linearly in accordance with the distance to the subject, described in FIGS. 4 to 10.

Note that it is assumed that the image for learning, obtained by capturing the subject at each distance with as fine granularity as possible from a lower limit value (near side) to an upper limit value (far side) of the distance that can be acquired (estimated) by the image processing device 3, is prepared in advance in the learning process of the first statistical model. Further, as the image for learning, it is preferable to prepare various images having different subjects.

Figure 18:
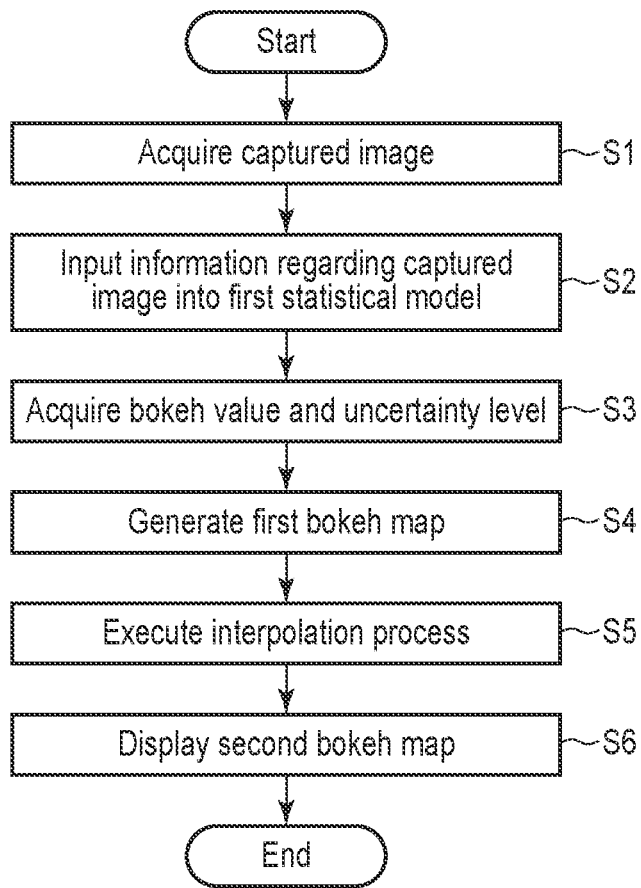
FIG. 18 is a flowchart illustrating an exemplary processing procedure of the image processing device.

Since the processing in Step S11 is the same processing as the processing in Step S2 illustrated in FIG. 18, the detailed description thereof will be omitted here.

When the information regarding the image for learning is input into the first statistical model, the bokeh value is estimated by the first statistical model (Step S12).

If the processing in Step S12 is executed, the first statistical model calculates an uncertainty level for the bokeh value estimated in Step S12 (Step S13).

The bokeh value estimated at Step S12 is compared with the correct value acquired at the time of capturing of the image for learning (Step S14).

The comparison result (error) in Step S14 is corrected using the uncertainty level calculated in Step S13 and fed back to the first statistical model (Step S15). Thus, a parameter in the first statistical model is updated such that the error is reduced (namely, learning of the bokeh occurring in the image for learning is carried out in accordance with the distance to the subject).

Figure 20:
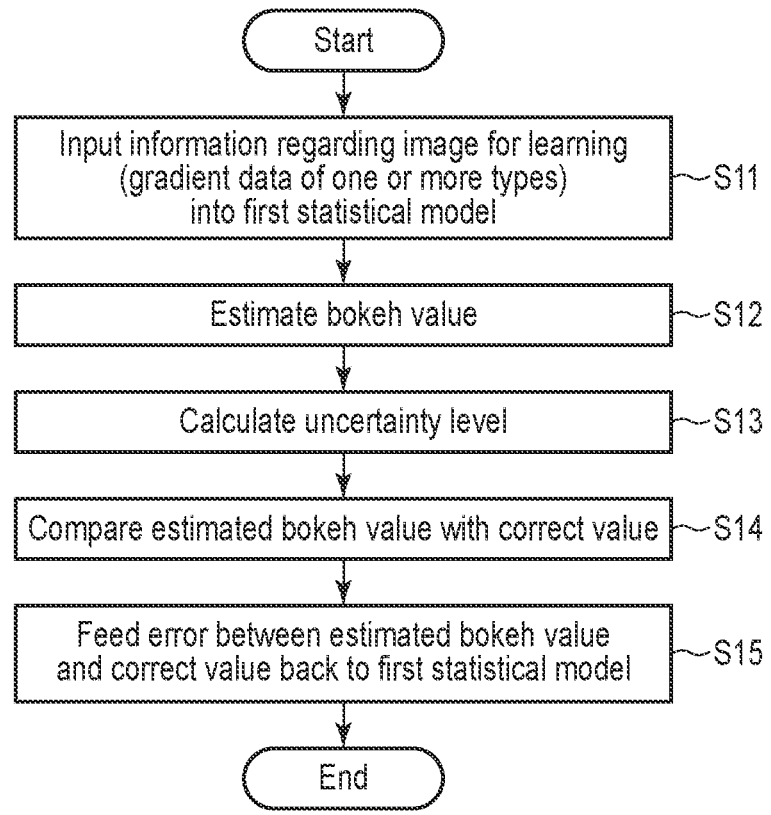
FIG. 20 is a flowchart illustrating an exemplary processing procedure of the learning process of the first statistical model.

As the process illustrated in FIG. 20 is repeatedly executed for each image for learning, the first statistical model with high estimation accuracy is generated. The first statistical model generated in this manner is stored in the first storage 31 included in the image processing device 3.

Figure 21:
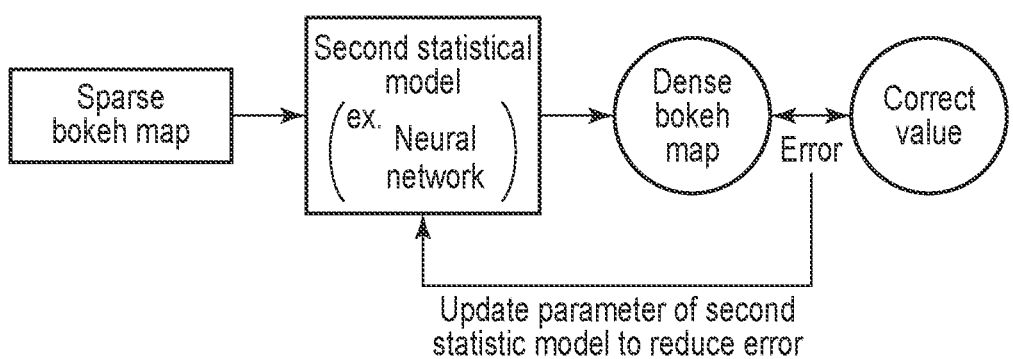
FIG. 21 is a diagram for describing an exemplary learning process of a second statistical model.

Next, an exemplary learning process of the second statistical model will be described with reference to FIG. 21. Although the learning process of the first statistical model described above is executed using the image for learning in which the distance to the subject is known and the bokeh value (correct value) indicating the bokeh occurring in the image for learning, the learning process of the second statistical model is executed using a sparse bokeh map and a dense bokeh map (correct value) corresponding to the sparse bokeh map.

Specifically, the learning process of the second statistical model is performed by inputting the sparse bokeh map to the second statistical model and feeding an error between the dense bokeh map estimated by the second statistical model (bokeh map in which bokeh values have been interpolated with respect to the sparse bokeh map) and the correct value back to the second statistical model. Note that the feedback refers to updating a parameter (for example, weighting factor) of the statistical model (here, the second statistical model) so as to reduce the error as described above.

Note that the sparse bokeh map used for the learning process of the second statistical model can be generated, for example, by masking a partial region of the dense bokeh map prepared in advance.

Further, the dense bokeh map can use, for example, the bokeh value with high reliability estimated by the first statistical model described above (for example, a bokeh map generated from a bokeh value with uncertainty lower than the threshold output from the first statistical model by inputting an image not including a textureless subject into the first statistical model), but may be, for example, a bokeh map generated from a bokeh value converted from an actual distance to a subject. The actual distance to the subject can be measured by, for example, stereo ranging using a stereo camera including (the optical system of) the two capture devices 2. Further, the actual distance to the subject may be measured using another distance measuring device such as a LiDAR.

Note that the conversion from the distance to the bokeh value can be performed using, for example, various parameters (for example, a focal length, an aperture value, a focal point, and the like) of the optical system of the capture device 2.

Further, the sparse bokeh map can be generated by masking a partial region of the dense bokeh map generated as described above, but may be generated based on a bokeh value converted from a sparse distance measured using, for example, a stereo camera, a LiDAR, or the like.

Next, an exemplary processing procedure of the learning process of the second statistical model will be described with reference to a flowchart of FIG. 22. Note that, for example, the process illustrated in FIG. 22 may be performed in the image processing device 3 or may be performed in a different device.

First, a sparse bokeh map prepared in advance is input into the second statistical model (Step S21).

When the sparse bokeh map is input into the second statistical model, a dense bokeh map is estimated by the second statistical model (Step S22).

The dense bokeh map estimated in Step S22 is compared with a dense bokeh map (namely, a correct value) corresponding to the sparse bokeh map input into the second statistical model in Step S1 (Step S23). In this case, each of the bokeh values (namely, bokeh values interpolated by the second statistical model) assigned to each of the pixels constituting the dense bokeh map estimated in Step S22 is compared with the bokeh value assigned to the corresponding pixel of the dense bokeh map which is the correct value.

A result of the comparison (error) at Step S23 is fed back to the second statistical model (Step S24). As a result, the parameter is updated so as to reduce the error in the second statistical model (namely, a sparse bokeh map and a dense bokeh map corresponding to the sparse bokeh map are learned).

The process illustrated in FIG. 22 is repeatedly executed for each set (namely, a learning data set) of the sparse bokeh map and the dense bokeh map, whereby the second statistical model with high estimation accuracy is generated. The second statistical model generated in this manner is stored in the second storage 35 included in the image processing device 3.

As described above, in the present embodiment, the first statistical model, generated by learning the bokeh that occurs in the image for learning (first image) affected by the aberration of the optical system and varies non-linearly according to the distance to the subject in the image, is stored in the first storage 31 in advance. When the captured image (second image) affected by the aberration of the optical system is acquired, the bokeh value output from the first statistical model and the uncertainty level indicating the level of uncertainty corresponding to the bokeh value are acquired by inputting the captured image into the first statistical model. Further, the second bokeh map, obtained by interpolating the bokeh value with respect to the first bokeh map generated based on the acquired bokeh value and uncertainty level, is acquired in the present embodiment.

Here, the first statistical model is generated so as to output the bokeh value and the uncertainty level for each of the pixels (or predetermined region including at least one pixel) constituting the captured image, and the first bokeh map corresponds to the sparse bokeh map in which the bokeh value with the uncertainty level lower than the threshold has been assigned to the pixel from which the bokeh value is output. On the other hand, the second bokeh map corresponds to the dense bokeh map in which the bokeh value has been interpolated for the pixel for which the uncertainty level equal to or higher than the threshold is output in the first bokeh map.

In the present embodiment, the three-dimensional structure of the subject that cannot be appropriately grasped with the first bokeh map (sparse bokeh map) can be appropriately grasped with the second bokeh map (dense bokeh map) with the above-described configuration.

Note that the second bokeh map can be acquired using the second statistical model generated by learning the sparse bokeh map and the dense bokeh map corresponding to the sparse bokeh map in the present embodiment.

Since the sparse bokeh map used in the learning process of the second statistical model can be generated by masking the partial region of the dense bokeh map used in the learning process of the second statistical model, the sparse bokeh map can be prepared relatively easily.

Further, the dense bokeh map used in the learning process of the second statistical model can be generated based on the bokeh value converted from a distance measured by a distance measuring device capable of measuring the distance to the subject, but may be prepared by another method such as using the bokeh value output from the first statistical model.

In a case where the first and second statistical models in the present embodiment are configured using, for example, neural networks, the first and second statistical models with high estimation accuracy can be constructed using various deep learning techniques.

In a case where the first and second statistical models are configured using random forests, it is possible to improve an explanatory property of an output result (estimation result) although the number of parameters increases as compared with the neural network.

Although the first and second statistical models in the present embodiment have been described as being neural networks or random forests, for example, other algorithms may be applied.

Although the description has been given in the present embodiment assuming that the bokeh value is interpolated with respect to the first bokeh map using the second statistical model, the bokeh value may be interpolated with respect to the first bokeh map, for example, by a method of assigning a bokeh value output (estimated) for a pixel for which an uncertainty level lower than the threshold has been output (calculated) to a neighboring pixel for which an uncertainty level equal to or higher than the threshold has been output. That is, the present embodiment may be configured such that the bokeh value with the uncertainty level output from the first statistical model equal to or higher than the threshold is interpolated with respect to the first bokeh map.

Further, the configuration in which the second bokeh map is acquired (displayed) from one captured image captured by the capture device 2 is assumed in the present embodiment, but there is a possibility that a second bokeh map capable of grasping a more accurate three-dimensional structure can be obtained by, for example, combining regions with high reliability (bokeh values with uncertainty levels lower than the threshold) obtained from each of time-series images obtained by capturing the same subject from a plurality of postures. In a case where smoothing (smoothing in a time-series direction) or the like is applied to the time-series images, it is possible to eliminate the influence of the atmosphere such as a heat haze that is likely to occur when a long-range subject is a target, for example.

Further, the description has been given in the present embodiment mainly assuming that the first map is generated based on the bokeh value with the uncertainty level equal to or higher than the threshold among the bokeh values acquired for the respective pixels. However, the first bokeh map may be generated by acquiring the bokeh value (namely, thinning out and processing a predetermined bokeh value) for each of the plurality of pixels (namely, the predetermined regions), for example, in order to speed up the processing in the image processing device 3. The present embodiment may be applied to the case of interpolating the bokeh value with respect to the sparse bokeh map (first bokeh map) obtained as a result of such thinning.

Second Embodiment

Next, a second embodiment will be described. In the present embodiment, descriptions of the same parts as those of the first embodiment described above will be omitted, and parts different from those of the first embodiment will be mainly described.

FIG. 23 is a diagram illustrating an exemplary configuration of an image processing system including an image processing device according to the present embodiment. In FIG. 23, the same parts as those in FIG. 1 described above will be denoted by the same reference signs, detailed descriptions thereof will be omitted, and parts different from those in FIG. 1 will be described.

As illustrated in FIG. 23, an image processing device 3 according to the present embodiment is different from the above-described first embodiment in terms of further including a region extraction module 37 in addition to the respective modules 31 to 36 illustrated in FIG. 1.

Note that the image processing device 3 according to the present embodiment has the hardware configuration illustrated in FIG. 2 described above, and a part or the whole of the region extraction module 37 is implemented by causing a CPU 301 (namely, a computer of the image processing device 3) to execute an image processing program 303A, that is, by software. Further, a part or the whole of the region extraction module 37 may be implemented by hardware such as an IC, or may be implemented by a combination of software and hardware.

The region extraction module 37 refers to the above-described uncertainty map and extracts a region in which an uncertainty level acquired by a map generation module 33 is lower than a threshold (hereinafter, referred to as a high-reliability bokeh region) and a region in which an uncertainty level is equal to or higher than the threshold (hereinafter, referred to as an interpolation bokeh region).

The high-reliability bokeh region and the interpolation bokeh region extracted by the region extraction module 37 are displayed on a second bokeh map by a display processing module 36.

Next, an exemplary processing procedure of the image processing device 3 according to the present embodiment will be described with reference to a flowchart of FIG. 24.

First, processing in Steps S31 to S35 corresponding to the processing in Steps S1 to S5 illustrated in FIG. 18 described above is performed.

Next, the region extraction module 37 extracts the high-reliability bokeh region and the interpolation bokeh region described above (Step S36). Note that, when the processing in Step S32 is executed, an uncertainty level for each of pixels constituting a captured image is output from a first statistical model, but the high-reliability bokeh region corresponds to a region including a pixel from which a bokeh value with the uncertainty level lower than the threshold has been output. On the other hand, the interpolation bokeh region corresponds to a region including a pixel for which a bokeh value with the uncertainty level equal to or higher than the threshold has been output (namely, the pixel for which the bokeh value has been discarded as an outlier or an abnormal value). In other words, the interpolation bokeh region is a region in which the bokeh value has been interpolated by executing the processing in Step S35.

The high-reliability bokeh region and the interpolation bokeh region can be extracted, for example, by binarizing an uncertainty map with a threshold. Note that, in Step S36, for example, a method (for example, an image filter such as a Gaussian filter and a median filter) of extracting the high-reliability bokeh region while removing noise using an average value or a median value in a kernel region in the uncertainty map may be applied.

When the processing in Step S36 is executed, the display processing module 36 displays the high-reliability bokeh region and the interpolation bokeh region extracted in Step S36 together with the second bokeh map acquired by executing the processing in Step S35 (Step S37).

FIG. 25 illustrates examples of the high-reliability bokeh region and the interpolation bokeh region displayed in Step S37.

In FIG. 25, a region 601 represents the high-reliability bokeh region, and a region 602 represents the interpolation bokeh region. The high-reliability bokeh region 601 is displayed in a color assigned to the high-reliability bokeh region (namely, a display color for visualizing the high-reliability bokeh region). On the other hand, the interpolation bokeh region 602 is displayed in a color assigned to the interpolation bokeh region (namely, a display color for visualizing the interpolation bokeh region). Note that the display color for visualizing the high-reliability bokeh region is a color different from the display color for visualizing the interpolation bokeh region.

Note that the high-reliability bokeh region 601 and the interpolation bokeh region 602 described above are drawn in colors (transparent colors) having transparency, for example, and are displayed to be superimposed on the second bokeh map (dense bokeh map) in the present embodiment.

According to such a configuration, the high-reliability bokeh region 601 and the interpolation bokeh region 602 (namely, the region to which the bokeh value output from the first statistical model has been assigned and the region in which the bokeh value has been interpolated by the second statistical model) on the second bokeh map can be easily grasped.

Although the description has been given herein assuming that the high-reliability bokeh region 601 and the interpolation bokeh region 602 are displayed in the transparent colors, but each of the high-reliability bokeh region 601 and the interpolation bokeh region 602 may be displayed in a mode of being filled with a color having no transparency (for example, one color). In this case, the high-reliability bokeh region 601 and the interpolation bokeh region 602 may be displayed side by side with the second bokeh map.

That is, the high-reliability bokeh region 601 and the interpolation bokeh region 602 may be displayed in a mode of being comparable with the second bokeh map in the present embodiment.

Further, the high-reliability bokeh region 601 and the interpolation bokeh region 602 may be displayed not only in the second bokeh map but also in combination with, for example, the captured image or the like.

Further, the description has been given herein assuming that the high-reliability bokeh region 601 and the interpolation bokeh region 602 are drawn (expressed) in different colors, but it suffices that the high-reliability bokeh region 601 and the interpolation bokeh region 602 are displayed in a mutually distinguishable mode. Specifically, the high-reliability bokeh region 601 and the interpolation bokeh region 602 may be expressed by, for example, the same color having different shades, or may be expressed by dots at different intervals. Further, each of the regions 601 and 602 may be expressed to be distinguishable by performing processing (drawing a boundary line with a predetermined color) on a boundary portion between the high-reliability bokeh region 601 and the interpolation bokeh region 602.

As described above, in the present embodiment, the high-reliability bokeh region (first region) in which the uncertainty level is lower than the threshold and the interpolation bokeh region (second region) in which the uncertainty level is equal to or higher than the threshold are extracted, and the extracted high-reliability bokeh region and interpolation bokeh region are displayed on the second bokeh map (dense bokeh map).

In the present embodiment, such a configuration allows a user to visually recognize the region with high reliability and the region in which the bokeh value has been interpolated, and it is easy to grasp a three-dimensional structure of a subject.

Note that non-linear bokeh, which is a physical clue regarding a distance to the subject, changes in accordance with a distance from a focal point (in-focus distance) to the subject as described above, but an upper limit is often set to a size (radius) of the bokeh in a learning process of the first statistical model. Specifically, for example, it is possible to consider a case where the first statistical model is learned by regarding a rectangular region of a 10-pixel square (a rectangular region having ten pixels on one side) as bokeh. With such a first statistical model, it is difficult to estimate a bokeh value for a subject present at a position where the radius of the bokeh exceeds five pixels (namely, a position deviated from a certain distance range based on the focal point).

In this case, a region (out-of-analysis-range region) in which the bokeh value cannot be estimated may be further displayed in addition to the high-reliability bokeh region 601 and the interpolation bokeh region 602 described above as illustrated in FIG. 26. In the example illustrated in FIG. 26, a near-distance region 603a in which a subject exists at a near position equal to or more than a certain distance range with the focal point as a reference and a far-distance region 603b in which a subject exists at a far position equal to or more than the certain distance range with the focal point as the reference are displayed as the out-of-analysis-range regions.

Note that the out-of-analysis-range regions (the near-distance region 603a and the far-distance region 603b) may be displayed in a mode (for example, different colors or the like) distinguishable from the high-reliability bokeh region 601 and the interpolation bokeh region 602.

Since the region in which the uncertainty level is lower than the threshold (namely, the high-reliability bokeh region) does not exist in the out-of-analysis-range region, if a bokeh value is to be interpolated in the out-of-analysis-range region, there is a high possibility that an erroneous bokeh value is interpolated. Therefore, when there is an out-of-analysis-range region, the out-of-analysis-range region is excluded from a target of the above-described interpolation process. In this case, the bokeh value is interpolated only in the interpolation bokeh region 602, and the second bokeh map in which the bokeh value is not interpolated in the out-of-analysis-range region is acquired in Step S35. Note that the out-of-analysis-range region is the region where the bokeh value cannot be estimated, and thus, can be determined by, for example, the first statistical model.

According to the configuration in which the out-of-analysis range region is displayed in addition to the highly-reliability bokeh region and the interpolation bokeh region as described above, the user can grasp that the out-of-analysis range region exists and adjust, for example, a focal point, an aperture (a size of an aperture), or a position of the subject (a distance from a capture device 2), or the like such that the captured image in which the three-dimensional structure is easily grasped (namely, the out-of-analysis-range region is reduced) is captured.

Third Embodiment

Next, a third embodiment will be described. In the present embodiment, descriptions of the same parts as those of the first and second embodiments described above will be omitted, and parts different from those of the first and second embodiments will be mainly described.

FIG. 27 is a diagram illustrating an exemplary configuration of an image processing system including an image processing device according to the present embodiment. In FIG. 27, the same parts as those in FIGS. 1 and 23 described above will be denoted by the same reference signs, detailed descriptions thereof will be omitted, and parts different from those in FIGS. 1 and 23 will be described.

As illustrated in FIG. 27, an image processing device 3 according to the present embodiment is different from the above-described second embodiment in terms of further including a threshold changing module 38 in addition to the respective modules 31 to 37 illustrated in FIG. 23.

Note that the image processing device 3 according to the present embodiment has the hardware configuration illustrated in FIG. 2 described above, and a part or the whole of the threshold changing module 38 is implemented by causing a CPU 301 (namely, a computer of the image processing device 3) to execute an image processing program 303A, that is, by software. Further, a part or the whole of the threshold changing module 38 may be implemented by hardware such as an IC, or may be implemented by a combination of software and hardware.

As described in the second embodiment, the threshold changing module 38 changes a threshold (hereinafter, expressed as an uncertainty threshold) for an uncertainty level according to an operation of a user with reference to a second bokeh map, a high-reliability bokeh region, and an interpolation bokeh region.

When the uncertainty threshold is changed by the threshold changing module 38, each of a map generation module 33 and a region extraction module 37 executes processing again according to the uncertainty threshold.

Next, an exemplary processing procedure of the image processing device 3 according to the present embodiment will be described with reference to a flowchart of FIG. 28.

First, processing in Steps S31 to S37 corresponding to the processing in Steps S41 to S47 illustrated in FIG. 24 described above is performed.

The description has been given in the above-described second embodiment assuming that the high-reliability bokeh region and the interpolation bokeh region are simply displayed on the second bokeh map. In the present embodiment, however, it is assumed that the user can perform an operation of changing the uncertainty threshold using, for example, an input device 305 on a screen on which the second bokeh map, the high-reliability bokeh region, and the interpolation bokeh region are displayed.

Figure 29:
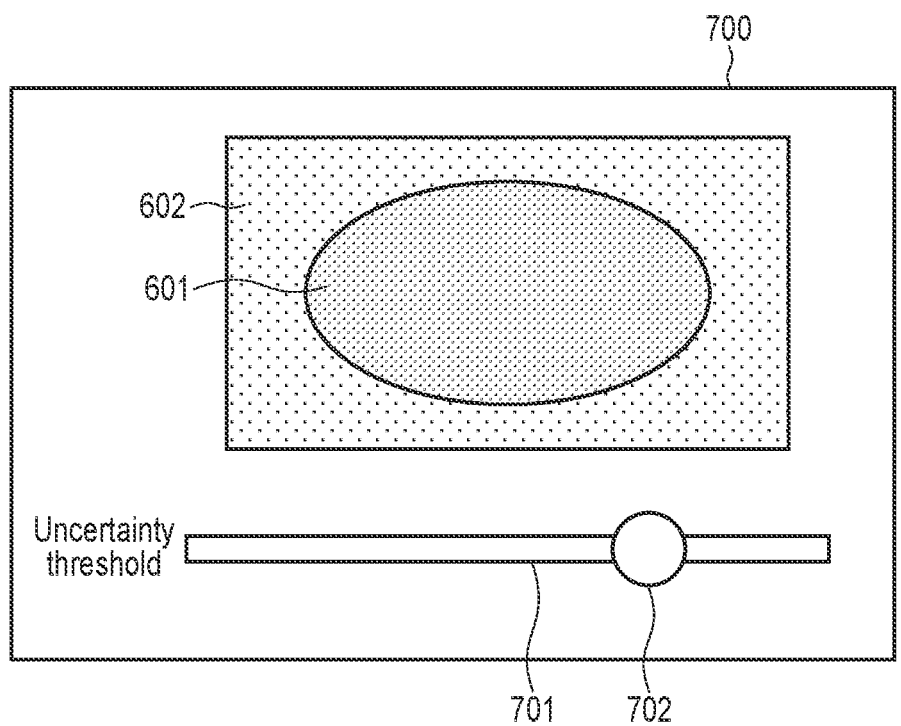
FIG. 29 is a diagram illustrating an exemplary screen on which a second bokeh map, a high-reliability bokeh region, and an interpolation bokeh region are displayed.

FIG. 29 illustrates an example of the screen on which the second bokeh map, the high-reliability bokeh region, and the interpolation bokeh region are displayed (hereinafter, simply referred to as a display screen). In the display screen 700 illustrated in FIG. 29, a high-reliability bokeh region 601 and an interpolation bokeh region 602 are displayed on the second bokeh map similarly to the second embodiment described above.

A slide bar 701 is further provided on the display screen 700 (near a region where the high-reliability bokeh region 601 and the interpolation bokeh region 602 are displayed) in the present embodiment. Further, a slider 702 that can slide (move) along the slide bar 701 is arranged on the slide bar 701. The user can perform an operation of changing the uncertainty threshold (hereinafter, referred to as a threshold change operation) on the display screen 700 by sliding the slider 702 on the slide bar 701.

Note that a right end of the slide bar 701 corresponds to an upper limit value of the uncertainty threshold, and a left end of the slide bar 701 corresponds to a lower limit value of the uncertainty threshold in the example illustrated in FIG. 29. When the display screen 700 is displayed, the slider 702 is arranged at a position corresponding to the current uncertainty threshold (namely, the threshold used in the processing in Steps S44 and S46). The user can give an instruction to increase the threshold when sliding the slider 702 rightward, and can give an instruction to decrease the threshold when sliding the slider 702 leftward.

Returning to FIG. 28 again, the threshold changing module 38 determines whether or not the threshold change operation has been performed by the user on the display screen 700 (slider 702) (Step S48).

When it is determined that the threshold change operation has been performed (YES in Step S48), the threshold changing module 38 changes the uncertainty threshold according to the threshold change operation (Step S49). When the operation of sliding the slider 702 is performed as the threshold change operation as described above, the threshold changing module 38 changes the uncertainty threshold to a value corresponding to a position of the slider 702 that has been slid.

When the processing in Step S49 is executed, the process returns to Step S44 and the processing is repeated. Specifically, in Step S44, an uncertainty map is binarized with the uncertainty threshold changed in Step S49 to generate a mask, and the mask is applied to an initial bokeh map, whereby a first bokeh map is generated again. In this case, the processing in Step S45 is executed using the first bokeh map generated again in Step S44. In Step S46, a high-reliability bokeh region and an interpolation bokeh region are extracted based on the uncertainty threshold changed in Step S49. After the processing in Steps S44 to S46 is executed again, the processing in Step S47 is further executed.

Figure 30:
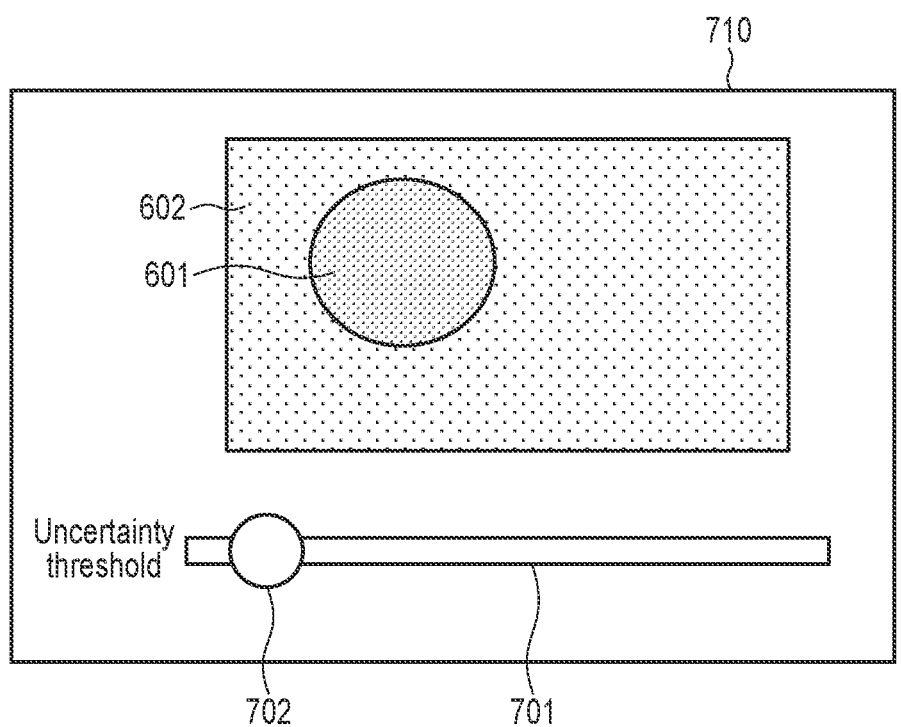
FIG. 30 is a diagram illustrating another exemplary screen on which the second bokeh map, the high-reliability bokeh region, and the interpolation bokeh region are displayed.

Note that the display screen 700 transitions to a display screen 710 illustrated in FIG. 30 when the threshold change operation of sliding the slider 702 leftward is performed on the display screen 700 illustrated in FIG. 29 and the processing in Steps S44 to S47 is executed again.

When the threshold change operation of sliding the slider 702 leftward is performed, the uncertainty threshold is changed to decrease. Thus, a range of the high-reliability bokeh region 601 (namely, an area of the region where the uncertainty level is lower than the threshold) decreases, and a range of the interpolation bokeh region 602 (namely, an area of the region where the uncertainty level is equal to or higher than the threshold) increases in the display screen 710 as compared with the high-reliability bokeh region 601 and the interpolation bokeh region 602 displayed in the display screen 700 illustrated in FIG. 29.

When it is determined that the threshold change operation has not been performed (NO in Step S48), the process illustrated in FIG. 28 is ended.

As described above, in the present embodiment, when the uncertainty threshold (threshold for the uncertainty level) is changed according to the operation (threshold change operation) by the user, the first bokeh map is generated again based on the bokeh value in which the uncertainty level is lower than the changed uncertainty threshold, and the high-reliability bokeh region in which the uncertainty level is lower than the changed uncertainty threshold and the interpolation bokeh region in which the uncertainty level is equal to or higher than the changed uncertainty threshold are extracted again.

Although it is difficult for the user who uses the image processing system 1 (image processing device 3) to intuitively understand the meaning of the uncertainty threshold, the user can adjust the uncertainty threshold such that a desired second bokeh map can be obtained since the change of the uncertainty threshold (namely, changes of the high-reliability bokeh region and the interpolation bokeh region) is visualized with the configuration according to the present embodiment.

Specifically, for example, in a case where a region corresponding to a textless subject, such as a table and a wall surface, is included in the high-reliability bokeh region, the user determines that the uncertainty threshold is too high, and can perform the threshold change operation of decreasing the uncertainty threshold. On the other hand, in a case where the range of the interpolation bokeh region is too large, the user can perform the threshold change operation of increasing the uncertainty threshold to reduce the range of the interpolation bokeh region. As a result, the user can adjust the high-reliability bokeh region and the interpolation bokeh region to fall within appropriate ranges, and thus, it can be expected to acquire a more appropriate second bokeh map.

Note that the description has been given in the present embodiment assuming that the threshold change operation using the slider 702 is performed as described with reference to FIG. 29 and the like, but a user interface (UI) for the threshold change operation is not limited to one described in the present embodiment. Specifically, for example, a threshold change operation of selecting a changed uncertainty threshold in a drop-down list may be performed, or a threshold change operation of directly inputting a changed uncertainty threshold (numerical value) into a numerical value input box may be performed.

Fourth Embodiment

Next, a fourth embodiment will be described. In the present embodiment, descriptions of the same parts as those of the first embodiment described above will be omitted, and parts different from those of the first embodiment will be mainly described.

FIG. 31 is a diagram illustrating an exemplary configuration of an image processing system including an image processing device according to the present embodiment. In FIG. 31, the same parts as those in FIG. 1 described above will be denoted by the same reference signs, detailed descriptions thereof will be omitted, and parts different from those in FIG. 1 will be described.

As illustrated in FIG. 31, an image processing device 3 according to the present embodiment is different from the above-described first embodiment in terms of including a bokeh-to-distance conversion module 39 in addition to the respective modules 31 to 36 illustrated in FIG. 1.

Note that the image processing device 3 according to the present embodiment has the hardware configuration illustrated in FIG. 2 described above, and a part or the whole of the bokeh-to-distance conversion module 39 is implemented by causing a CPU 301 (namely, a computer of the image processing device 3) to execute an image processing program 303A, that is, by software. Further, a part or the whole of the bokeh-to-distance conversion module 39 may be implemented by hardware such as an IC, or may be implemented by a combination of software and hardware.

The bokeh-to-distance conversion module 39 converts a bokeh value assigned to each of pixels constituting a second bokeh map (dense bokeh map) into a distance (distance to a subject in an image in which bokeh, indicated by the bokeh value, has occurred).

The distance converted from the bokeh value by the bokeh-to-distance conversion module 39 is displayed by a display processing module 36 as, for example, a distance map (dense distance map).

Figure 32:
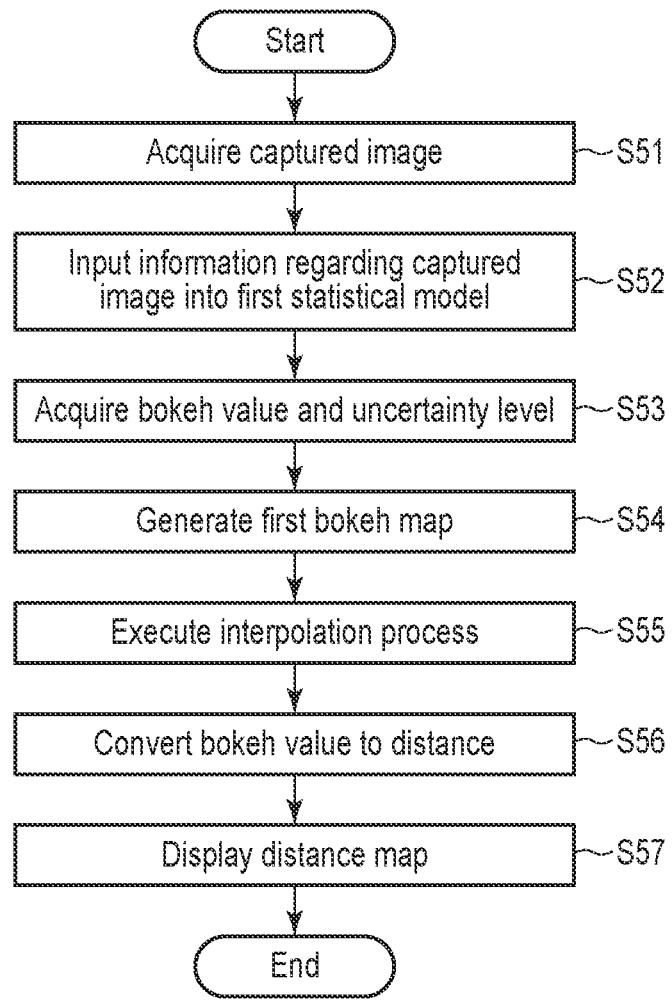
FIG. 32 is a flowchart illustrating an exemplary processing procedure of the image processing device.

Next, an exemplary processing procedure of the image processing device 3 according to the present embodiment will be described with reference to a flowchart of FIG. 32.

First, processing in Steps S51 to S55 corresponding to the processing in Steps S1 to S5 illustrated in FIG. 18 described above is performed.

Here, the second bokeh map acquired by executing processing in Step S55 is useful information for grasping a three-dimensional structure of the subject as described above, but it is difficult to grasp the distance to the subject.

Therefore, the bokeh-to-distance conversion module 39 converts the bokeh value assigned to each of the pixels constituting the second bokeh map acquired by executing the processing in Step S55 into the distance to the subject (subject included in a captured image) (Step S56).

Note that a correspondence relationship between a bokeh value b and a distance z is expressed by the following Formula (1).

$$b = \frac{fv}{2pF}\left(\frac{1}{f} - \frac{1}{z} - \frac{1}{v}\right) \quad \text{Formula (1)}$$

In Formula (1), f represents a focal length of a capture device 2 (namely, an optical system that captures the captured image). Further, v represents a distance between a lens 21 and an image sensor 22 when the captured image is obtained. Further, p represents a pixel pitch in the captured image. Further, F represents an aperture value (f-number).

According to the above Formula (1), if the focal length f, the distance v between the lens 21 and the image sensor 22, the aperture value F (namely, a camera parameter), and the pixel pitch p are known in advance, the bokeh value b assigned to each of the pixels constituting the second bokeh map can be converted into the distance z (namely, the distance z can be calculated from the bokeh value b).

When the processing in Step S56 described above is executed, the bokeh-to-distance conversion module 39 can acquire the distance for each pixel.

Note that the distance can be calculated using geometric information (camera parameter) as described above. The distance can be calculated using the geometric information of the entire optical system, for example, even in a case where the optical system of the capture device 2 includes a plurality of lenses.

For example, there is a case where it is difficult to obtain detailed geometric information (measure a geometric structure) in the capture device 2 using a commercially available lens. In such a case, the correspondence relationship between the bokeh and the distance can be correctly reflected (adjusted) by adjusting a bokeh scale correction coefficient not shown in Formula (1). The bokeh scale correction coefficient can be calculated by using a plurality of combinations (correspondence relationships) between bokeh values indicating bokeh occurring in an image (image captured by the capture device 2) including a subject whose distance is known or a subject whose distance is measured by a distance measuring device (laser ranging device or the like) and the distance. The bokeh scale correction coefficient may be calculated using an optimization method such as error minimization. Note that the distance v may be adjusted similarly to the bokeh scale correction coefficient described above although the distance v (namely, the focal point) between the lens 21 and the image sensor 22 is basically fixed.

Further, a statistical model capable of converting the bokeh value into the distance may be constructed by causing a neural network or the like to learn a correspondence relationship among the geometric information, the bokeh value, and the distance.

The display processing module 36 displays the distance converted from the bokeh value in Step S56 (Step S57). Since the bokeh value is converted into the distance for each pixel in Step S56, the distance map (dense distance map), generated by assigning the distance converted from the bokeh value to each of the pixels constituting the second bokeh map (dense bokeh map), can be displayed in Step S57, for example. In the distance map, for example, a color corresponding to the distance is expressed in each of the pixels, and thus, the user can intuitively grasp the distance to the subject.

Note that, in Step S57, distances converted from bokeh values assigned to pixels corresponding to a specific subject (namely, pixels constituting a region including the subject) may be displayed as the distances to the subject, instead of the format of the distance map. Further, the distance converted from the bokeh value in Step S56 may be output (transmitted) to the outside of the image processing device 3 (image processing system 1), for example, and used for other processing.

As described above, the configuration in which the bokeh value assigned to each of the pixels constituting the second bokeh map is converted into the distance enables the user to grasp not only the three-dimensional structure of the subject but also the distance to the subject in the present embodiment.

Although the description has been given in the present embodiment assuming that the bokeh-to-distance conversion module 39 is further added to the image processing device 3 described in the first embodiment described above, the present embodiment may be implemented in combination with the second and third embodiments described above. That is, the bokeh-to-distance conversion module 39 may be added to the image processing device 3 described in the second and third embodiments.

Application Example

Hereinafter, for example, an application example to which the image processing system 1 capable of acquiring (measuring) the distance to the subject as in the above-described fourth embodiment is applied will be described.

Here, a case where the image processing system 1 is implemented as one device (hereinafter, referred to as a ranging device) including an image capturing unit corresponding to the capture device 2 illustrated in FIG. 31 and an image processing unit corresponding to the image processing device 3 will be described for the sake of convenience. In the following drawings, it is assumed that the ranging device 1 includes an image capturing unit 2 and an image processing unit 3.

Note that the image processing system (ranging device) 1 described in the first to third embodiments described above may be applied depending on an environment in which the image processing system 1 is applied.

Figure 33:
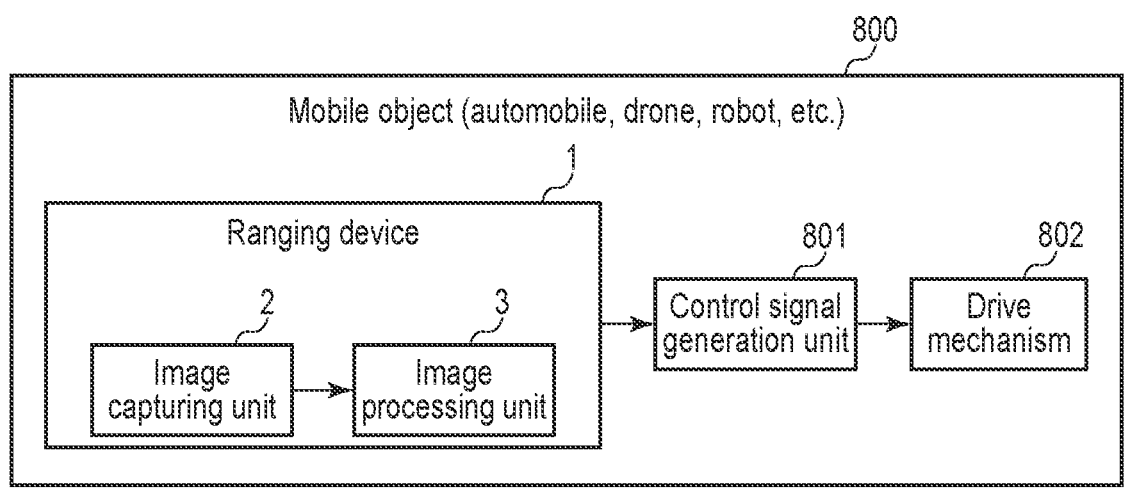
FIG. 33 is a diagram illustrating an exemplary functional configuration of a mobile object including a ranging device.

FIG. 33 illustrates an exemplary functional configuration of a mobile object 800 in which the ranging device 1 is incorporated. The mobile object 800 can be implemented as, for example, an automobile, an unmanned aerial vehicle, an autonomous mobile robot, or the like having an automatic driving function. The unmanned aerial vehicle is an airplane, a rotorcraft, a glider, or an airship that nobody can board and can fly under remote control or on autopilot. Examples thereof include a drone (multicopter), a radio-controlled airplane, a crop-dusting helicopter, and the like. Examples of the autonomous mobile robot include a mobile robot such as an automated guided vehicle (AGV), a cleaning robot for cleaning a floor, a communication robot that guides visitors variously, and the like. Examples of the mobile object 800 include not only a robot body that moves but also an industrial robot having a drive mechanism that moves or rotates a part of the robot, such as a robot arm.

As illustrated in FIG. 33, the mobile object 800 includes, for example, the ranging device 1, a control signal generation unit 801, and a drive mechanism 802. The ranging device 1 is installed such that, for example, the image capturing unit 2 can capture an image of a subject in a traveling direction of the mobile object 800 or a part thereof.

Figure 34:
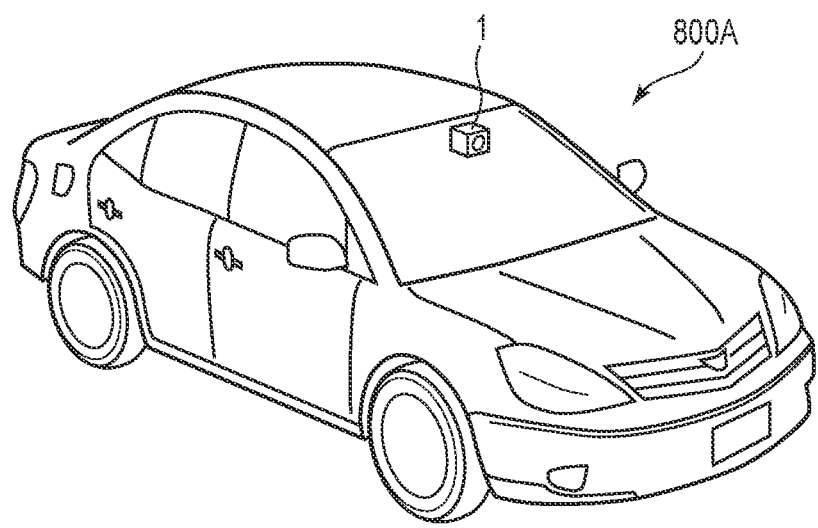
FIG. 34 is a view for describing a case where the mobile object is an automobile.

In a case where the mobile object 800 is an automobile 800A as illustrated in FIG. 34, the ranging device 1 is installed as a so-called front camera that captures an image of the front. Note that the ranging device 1 may be installed as a so-called rear camera that captures an image of the rear during backward movement. Further, a plurality of the ranging devices 1 may be installed as the front camera and the rear camera. Further, the ranging device 1 may be installed to also serve as a so-called drive recorder. That is, the ranging device 1 may be a recording device.

Figure 35:
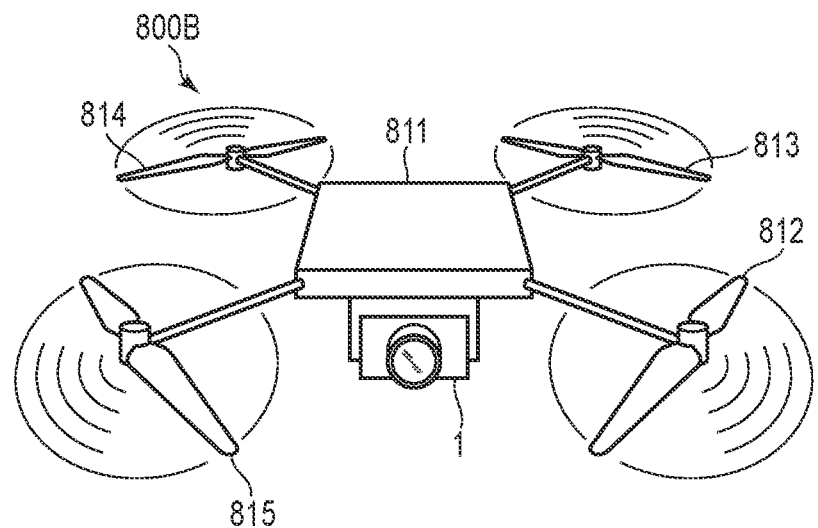
FIG. 35 is a view for describing a case where the mobile object is a drone.

FIG. 35 illustrates an example in which the mobile object 800 is a drone 800B. The drone 800B includes a drone body 811 corresponding to the drive mechanism 802 and four propeller units 812 to 815. Each of the propeller units 812 to 815 includes a propeller and a motor. When driving of the motor is transmitted to the propeller, the propeller rotates, and the drone 800B floats by the lift generated by the rotation. The ranging device 1 is mounted on, for example, a lower portion of the drone body 811.

Figure 36:
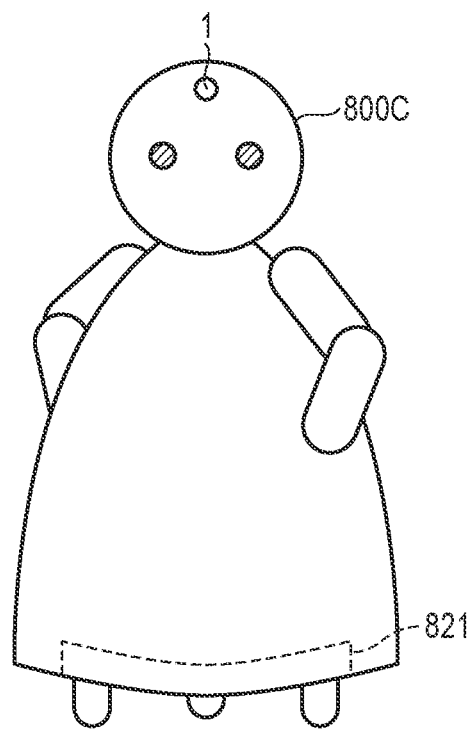
FIG. 36 is a view for describing a case where the mobile object is an autonomous mobile robot.

FIG. 36 illustrates an example in which the mobile object 800 is an autonomous mobile robot 800C. A power unit 821, which corresponds to the drive mechanism 802 and includes a motor, wheels, and the like, is provided in a lower portion of the mobile robot 800C. The power unit 821 controls a rotational speed of the motor and a direction of the wheels. The mobile robot 800C can move in an arbitrary direction as driving of the motor is transmitted to rotate the wheels installed on a road surface or a floor surface and the direction of the wheels is controlled. In the example illustrated in FIG. 36, the ranging device 1 is installed on a head of the mobile robot 800C such that, for example, the image capturing unit 2 captures an image of the front of the humanoid mobile robot 800C. Note that the ranging device 1 may be installed so as to capture images of the rear, the left, and the right of the mobile robot 800C, or a plurality of the ranging devices 1 may be installed so as to capture images of a plurality of directions. Further, it is also possible to perform dead reckoning by providing the ranging device 1 in a small robot having a small space for mounting a sensor or the like and estimating a self-position, a posture, and a position of a subject.

Figure 37:
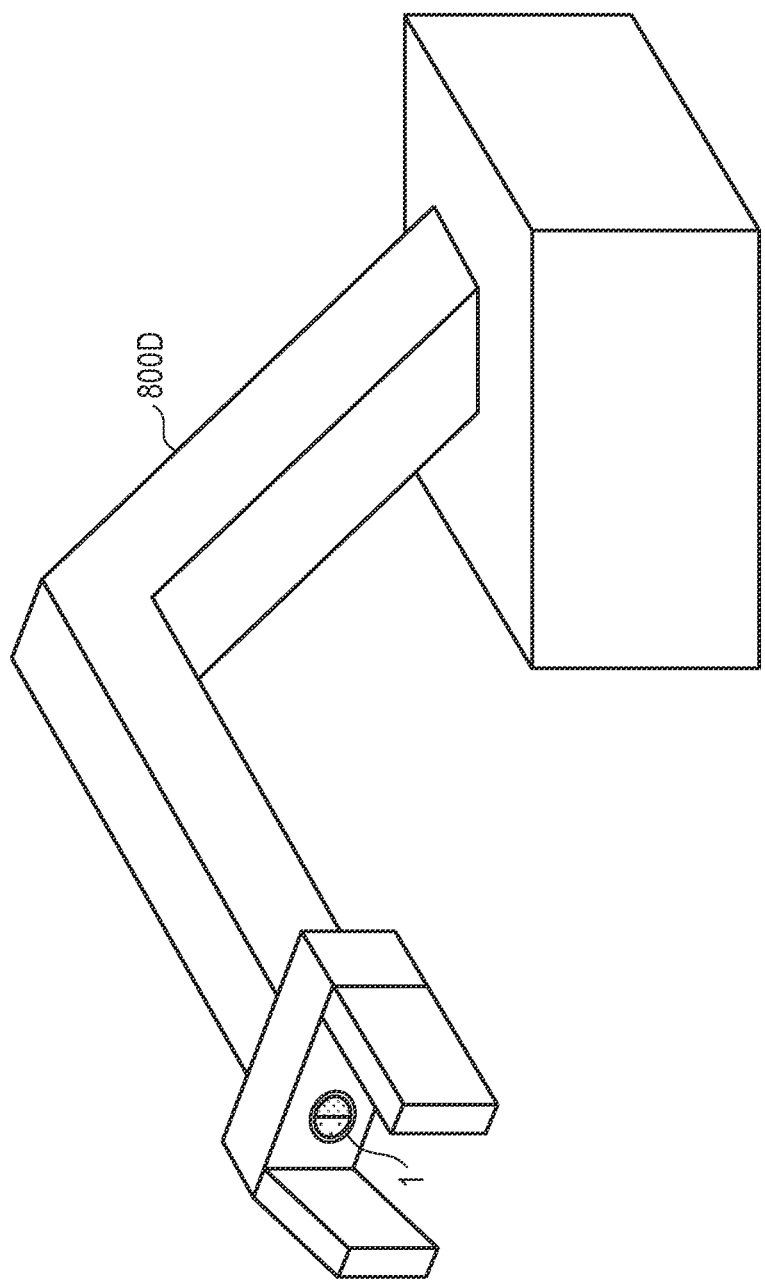
FIG. 37 is a view for describing a case where the mobile object is a robot arm.

Note that, in a case where the mobile object 800 is a robot arm 800D and movement and rotation of a part of the robot arm 800D are controlled as illustrated in FIG. 37, the ranging device 1 may be installed at a distal end or the like of the robot arm 800D. In this case, an object gripped by the robot arm 800D is captured by the image capturing unit 2 included in the ranging device 1, and the image processing unit 3 can estimate a distance to the object to be gripped by the robot arm 800D. As a result, the robot arm 800D can perform an operation of accurately gripping the object.

The control signal generation unit 801 outputs a control signal for controlling the drive mechanism 802 based on distance information indicating a distance to a subject output from the ranging device 1 (image processing unit 3). The drive mechanism 802 drives the mobile object 800 or a part of the mobile object 800 in accordance with the control signal output from the control signal generation unit 801. For example, the drive mechanism 802 performs at least one of movement, rotation, acceleration, deceleration, adjustment of thrust (lift), a change in the traveling direction, switching between a normal driving mode and an automatic driving mode (collision avoidance mode), and activation of a safety device, such as an airbag, of the mobile object 800 or a part of the mobile object 800. For example, in a case where the distance to the subject is less than a threshold, the drive mechanism 802 may perform at least one of movement, rotation, acceleration, adjustment of thrust (lift), changing a direction to a direction approaching the object, and switching from the automatic driving mode (collision avoidance mode) to the normal driving mode.

The drive mechanism 802 of the automobile 800A illustrated in FIG. 34 is, for example, a tire. The drive mechanism 802 of the drone 800B illustrated in FIG. 35 is, for example, the propeller. The drive mechanism 802 of the mobile robot 800C illustrated in FIG. 36 is, for example, a leg. The drive mechanism 802 of the robot arm 800D illustrated in FIG. 37 is, for example, a support unit that supports the distal end provided with the ranging device 1.

The mobile object 800 may further include a speaker or a display to which information (distance information) regarding the distance to the subject output from the ranging device 1 is input. The speaker or the display is connected to the ranging device 1 in a wired or wireless manner, and is configured to output a sound or an image related to the distance to the subject. Further, the mobile object 800 may include a light emitting unit to which the information regarding the distance to the subject output from the ranging device 1 is input and which can be turned on and off according to the distance to the subject, for example.

For example, in the case where the mobile object 800 is the drone 800B, the image capturing unit 2 acquires an image obtained by capturing a target, and it is determined whether the distance to the subject is equal to or more than the threshold when creation of a map (three-dimensional shape of an object), structural investigation of buildings and topographies, inspection of cracks, electric wire breakage, and the like are performed from the sky. Based on a result of the determination, the control signal generation unit 801 generates a control signal for controlling the thrust of the drone 800B such that the distance to the inspection target becomes constant. Here, it is assumed that the thrust includes lift. The drive mechanism 802 operates the drone 800B based on the control signal, so that the drone 800B can fly in parallel with the inspection target. In a case where the mobile object 800 is a monitoring drone, a control signal for controlling the thrust of the drone so as to keep a distance to a monitoring target object constant may be generated.

In a case where the mobile object 800 (for example, drone 800B) is used for maintenance and inspection of various infrastructures (hereinafter, simply referred to as the infrastructure), the image capturing unit 2 captures an image of a part in need of repair (hereinafter, referred to as a repair part) including a cracked part, a rusted part, or the like in the infrastructure, so that a distance to the repaired part can be obtained. In this case, a size of the repaired part can be calculated from the image by using the distance to the repaired part. As a result, for example, the repair part is displayed on a map representing the entire infrastructure so that a maintenance inspector of the infrastructure can recognize the repair part. Further, it is also useful to notify the maintenance inspector of the size of the repair part in advance in order to perform smooth repair work.

During flight of the drone 800B, the image capturing unit 2 acquires an image obtained by capturing a ground direction, and determines whether or not a distance to the ground is equal to or more than a threshold. The control signal generation unit 801 generates a control signal for controlling the thrust of the drone 800B such that a height from the ground becomes a designated height based on a result of the determination. The drive mechanism 802 operates the drone 800B based on the control signal, so that the drone 800B can fly at the designated height. If the drone 800B is a pesticide application drone, the pesticide can be easily evenly applied since the height of the drone 800B from the ground is kept constant in this manner.

In the case where the mobile object 800 is the automobile 800A or the drone 800B, the image capturing unit 2 captures an image of an automobile at the front or a surrounding drone, and it is determined whether or not a distance to the automobile or the drone is equal to or more than a threshold during regimental travel of the automobile 800A or cooperative flight of the drone 800B. Based on a result of the determination, the control signal generation unit 801 generates a control signal for controlling the speed of the automobile 800A or the thrust of the drone 800B so that a distance to the automobile at the front or the surrounding drone becomes constant. The drive mechanism 802 operates the automobile 800A and the drone 800B based on the control signal, so that the regimental travel of the automobile 800A or the cooperative flight of the drone 800B can be easily performed.

In the case where the mobile object 800 is the automobile 800A, it may be configured such that an instruction of a driver can be received via a user interface such that the driver of the automobile 800A can set (change) a threshold. As a result, it is possible to cause the automobile 800A to travel at an inter-vehicle distance preferred by the driver. Further, the threshold may be changed according to the speed of the automobile 800A in order to maintain a safe inter-vehicle distance from the automobile at the front. The safe inter-vehicle distance varies depending on the speed of the automobile 800A. Therefore, the threshold can be set to be larger (longer) as the speed of the automobile 800A is faster.

Further, in the case where the mobile object 800 is the automobile 800A, a predetermined distance in the traveling direction may be set as a threshold, and a control signal for operating a brake or operating a safety device, such as an airbag, may be generated when an object appears before the threshold. In this case, the safety device such as an automatic brake and an airbag is provided in the drive mechanism 802.

According to at least one embodiment described above, it is possible to provide an image processing device, a method, and a program capable of grasping a three-dimensional structure of a subject.

Further, each of the various functions described in the respective embodiments may be implemented by a circuit (processing circuit). Examples of the processing circuit include a programmed processor such as a central processing unit (CPU). The processor executes each of the described functions by executing a computer program (command group) stored in a memory. The processor may be a microprocessor including an electrical circuit. Examples of the processing circuit also include a digital signal processor (DSP), an application-specific integrated circuit (ASIC), a microcontroller, a controller, and other electrical circuit components. Each of the components other than the CPU described in the embodiments may also be implemented by a processing circuit.

Further, the various processes of the respective embodiments can be implemented by a computer program, and thus, the same effects as those of the respective embodiments can be easily implemented only by installing and executing the computer program in a computer through a computer-readable storage medium storing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
a first storage configured to store a first statistical model generated by learning bokeh which occurs in a first image affected by aberration of a first optical system, and varies non-linearly in accordance with a distance to a subject in the first image; and
a processor configured to:

acquire a second image affected by aberration of a second optical system;

acquire a bokeh value which indicates bokeh occurring in the acquired second image and an uncertainty level which indicates a level of uncertainty for the bokeh value, the bokeh value and the uncertainty level being output from the first statistical model by inputting the second image into the first statistical model;

generate a first bokeh map based on the acquired bokeh value and uncertainty level; and acquire a second bokeh map obtained by interpolating a bokeh value with respect to the first bokeh map.

2. The image processing device according to claim 1, wherein the first statistical model is generated so as to output a bokeh value and an uncertainty level for each predetermined region including at least one pixel constituting the second image input into the first statistical model, the first bokeh map is equivalent to a sparse bokeh map in which a bokeh value with an uncertainty level lower than a threshold is assigned to a pixel for which the bokeh value has been output, and the second bokeh map equivalent to a dense bokeh map in which a bokeh value is interpolated for a pixel of the first bokeh map for which an uncertainty level equal to or higher than the threshold has been output.

3. The image processing device according to claim 2, further comprising a second storage configured to store a second statistical model generated by learning a sparse bokeh map prepared in advance and a dense bokeh map corresponding to the sparse bokeh map, wherein the processor is configured to acquire a second bokeh map output from the second statistical model by inputting the first bokeh map to the second statistical model.

4. The image processing device according to claim 3, wherein the sparse bokeh map learned by the second statistical model is generated by masking a partial region of the dense bokeh map learned by the second statistical model.

5. The image processing device according to claim 4, wherein the dense bokeh map learned by the second statistical model is generated based on a bokeh value converted from a distance measured by a distance measuring device capable of measuring a distance to a subject.

6. The image processing device according to claim 2, wherein the processor is configured to convert a bokeh value assigned to each of pixels in the second bokeh map into a distance to a subject included in the second image.

7. The image processing device according to claim 1, wherein the processor is configured to display the second bokeh map.

8. The image processing device according to claim 7, wherein the processor is configured to:

extract a first region in which the acquired uncertainty level is lower than a threshold and a second region in which the uncertainty level is equal to or higher than the threshold; and display the first and second regions on the second bokeh map.

9. The image processing device according to claim 8, wherein the processor is configured to:

change the threshold in accordance with an operation of a user;

generate a first bokeh map again based on a bokeh value in which an uncertainty level is lower than the changed threshold; and extract a first region in which the acquired uncertainty level is lower than the changed threshold and a second region in which the acquired uncertainty level is equal to or higher than the changed threshold again.

10. The image processing device according to claim 1, wherein the first statistical model is a neural network or a random forest.

11. A method executed by an image processing device, which comprises a first storage configured to store a first statistical model generated by learning bokeh which occurs in a first image affected by aberration of a first optical system, and varies non-linearly in accordance with a distance to a subject in the first image, the method comprising:

acquiring a second image affected by aberration of a second optical system;

acquiring a bokeh value which indicates bokeh occurring in the acquired second image and an uncertainty level which indicates a level of uncertainty for the bokeh value, the bokeh value and the uncertainty level being output from the first statistical model by inputting the second image into the first statistical model;

generating a first bokeh map based on the acquired bokeh value and uncertainty level; and acquiring a second bokeh map obtained by interpolating a bokeh value with respect to the first bokeh map.

12. A non-transitory computer-readable storage medium having stored thereon a computer program which is executable by a computer of an image processing device comprising a first storage configured to store a first statistical model generated by learning bokeh which occurs in a first image affected by aberration of a first optical system, and varies non-linearly in accordance with a distance to a subject in the first image, the computer program comprising instructions capable of causing the computer to execute functions of:

acquiring a second image affected by aberration of a second optical system;

acquiring a bokeh value which indicates bokeh occurring in the acquired second image and an uncertainty level which indicates a level of uncertainty for the bokeh value, the bokeh value and the uncertainty level being output from the first statistical model by inputting the second image into the first statistical model;

generating a first bokeh map based on the acquired bokeh value and uncertainty level; and acquiring a second bokeh map obtained by interpolating a bokeh value with respect to the first bokeh map.

\* \* \* \* \*